(12) United States Patent
Kobayashi

(10) Patent No.: US 8,531,601 B2
(45) Date of Patent: Sep. 10, 2013

(54) IMAGE PROCESSING APPARATUS AND CONTROL METHOD

(75) Inventor: Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1085 days.

(21) Appl. No.: 12/186,585

(22) Filed: Aug. 6, 2008

(65) Prior Publication Data

US 2009/0040376 A1 Feb. 12, 2009

(30) Foreign Application Priority Data

Aug. 8, 2007 (JP) ................................. 2007-207185

(51) Int. Cl.
*H04N 7/01* (2006.01)
*H04N 11/20* (2006.01)

(52) U.S. Cl.
USPC ............................. 348/452; 342/441; 342/607

(58) Field of Classification Search
USPC ................. 348/441, 447–448, 452, 458–459, 348/497, 607, 699
See application file for complete search history.

(56) References Cited

U.S. PATENT DOCUMENTS

| | | | |
|---|---|---|---|
| 6,442,203 B1 | 8/2002 | Demos | 375/240.16 |
| 6,477,279 B2 * | 11/2002 | Go | 382/240 |
| 6,900,846 B2 | 5/2005 | Lee et al. | 348/459 |
| 7,098,959 B2 | 8/2006 | Mishima et al. | 348/459 |
| 7,116,372 B2 * | 10/2006 | Kondo et al. | 348/448 |
| 7,180,548 B2 | 2/2007 | Mishima et al. | 348/441 |
| 8,077,258 B2 | 12/2011 | Take et al. | 348/448 |
| 8,085,848 B2 * | 12/2011 | Kurata | 375/240.16 |
| 2002/0015104 A1 | 2/2002 | Itoh et al. | 348/459 |
| 2004/0153581 A1 | 8/2004 | Nakaya et al. | 710/1 |
| 2004/0246374 A1 | 12/2004 | Mishima et al. | 348/441 |
| 2006/0119617 A1 | 6/2006 | Toyooka et al. | 345/619 |
| 2006/0152443 A1 | 7/2006 | Song et al. | 345/63 |
| 2006/0227249 A1 | 10/2006 | Chen et al. | 348/631 |
| 2006/0239294 A1 * | 10/2006 | Wogsberg | 370/466 |
| 2006/0256238 A1 | 11/2006 | Mishima et al. | 348/459 |
| 2009/0040374 A1 | 2/2009 | Kobayashi | 348/448 |

FOREIGN PATENT DOCUMENTS

| | | |
|---|---|---|
| CN | 1804966 A | 7/2006 |
| CN | 1848234 A | 10/2006 |
| EP | 1 164 792 A2 | 12/2001 |
| EP | 1 708 488 A2 | 10/2006 |
| JP | 06-70288 | 3/1994 |
| JP | 2002-351382 | 12/2002 |
| JP | 2004-159294 | 6/2004 |
| JP | 2004-297719 | 10/2004 |
| KR | 1020010111740 A | 12/2001 |

* cited by examiner

*Primary Examiner* — Pankaj Kumar
*Assistant Examiner* — Charles N Hicks
(74) *Attorney, Agent, or Firm* — Fitzpatrick, Cella, Harper & Scinto

(57) ABSTRACT

This invention enables reduction of moving blurring in a hold-type display device and reduce flicker in an impulse-type display device, and also enables to suppress distortion such as ghost or tail-blurring in pursuit. A LPF generates low-frequency image data from input frame. High-frequency emphasized image data is also generated using a subtractor and an adder. A SizeDown unit reduces the low-frequency image data to decrease the number of pixels. A motion detection/motion application unit performs motion detection and motion application from the reduced image data of the frame of interest and that of the next frame to generate reduced image data located at the intermediate position between them. A SizeUp unit enlarges the generated reduced image data. Another LPF filters the enlarged image data and outputs the result as low-frequency image data. A switch alternately outputs the high-frequency emphasized and the low-frequency images at a speed twice the input frame rate.

8 Claims, 26 Drawing Sheets

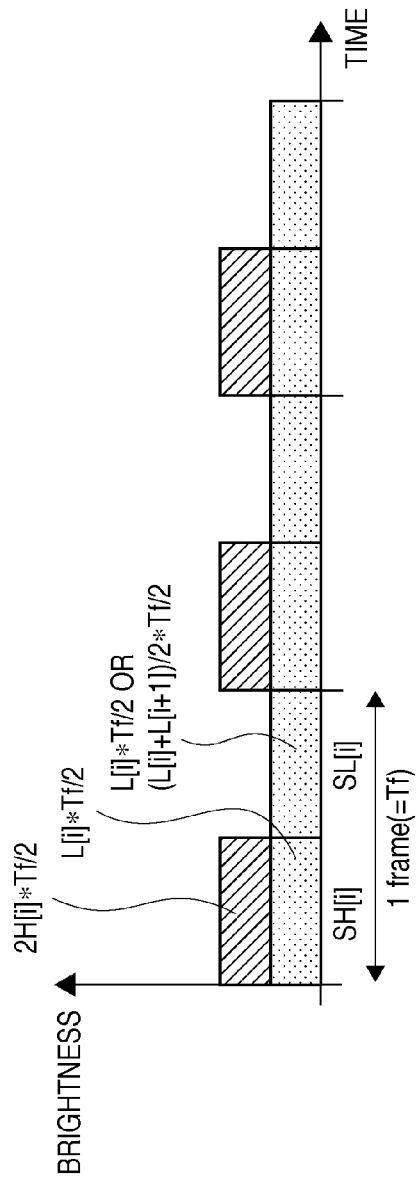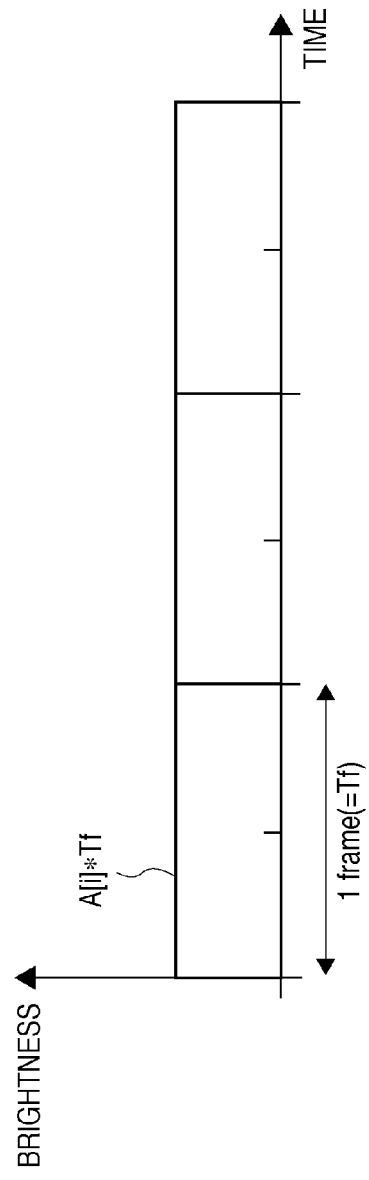

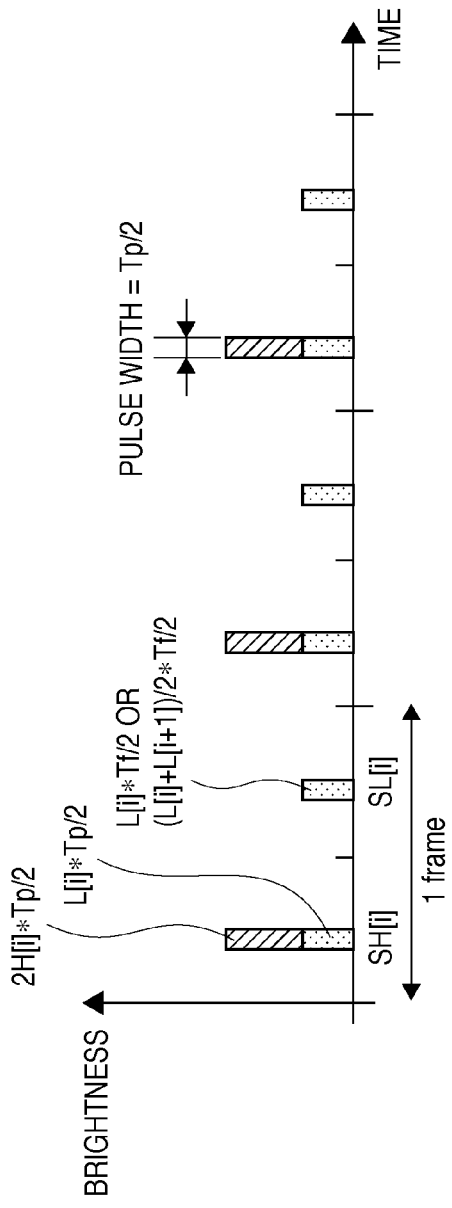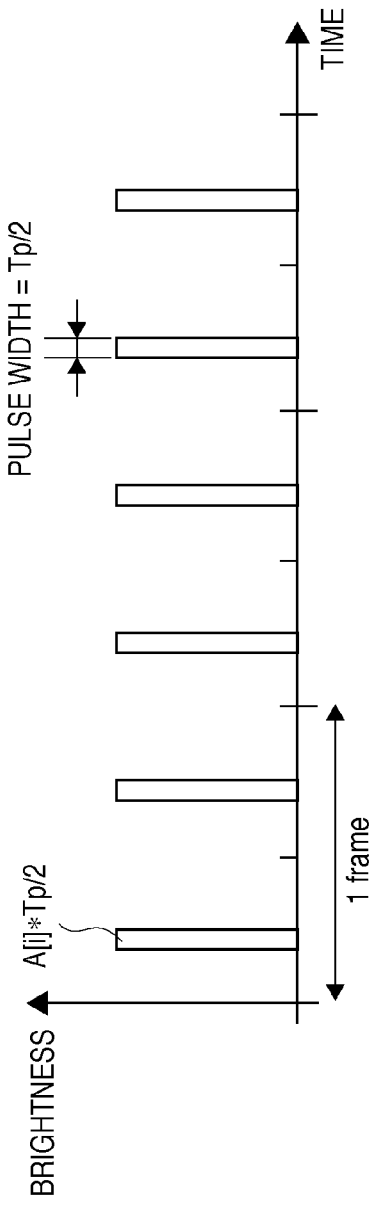

IMAGE PROCESSING APPARATUS AND CONTROL METHOD

BACKGROUND OF THE INVENTION

1. Field of the Invention

The present invention relates to an image processing apparatus for converting moving image data into moving image data having a higher frame rate, and a method of controlling the same.

2. Description of the Related Art

Conventionally, a CRT has been synonymous with a moving image display device for, for example, television. However, liquid crystal displays, plasma displays, and FED displays have been put into practical use in recent years. That is, there are various types of displays now.

Different types of displays adopt different display methods. For example, display devices based on a liquid crystal device (e.g., direct-view-type liquid crystal display device, liquid crystal rear projector, and liquid crystal front projector) can use many scanning methods. In any case, the light output period in each pixel portion occupies a large part of the display period of one frame. For this reason, such a display device is called a hold-type display device.

On the other hand, in, for example, a CRT or FED, light is output in each pixel portion once in a frame. The light emission time is much shorter than the frame display period and is normally 2 msec or less. For this reason, such a display device is called an impulse-type display device.

There also exist plasma displays and field sequential displays which are of types different from the above-described classifications.

The display methods of the respective types have the following features.

(1) Hold-Type Display Device

A display device of this type emits light during a large part of a frame period. Hence, the temporal imbalance of light intensity is small, and flicker is rarely observed. Additionally, pursuit (pursuing a moving portion in a moving image by eyes) makes moving blurring relatively large in accordance with the length of the light emission period in a frame. "Moving blurring" here is different from that caused by the response characteristic of a display device.

(2) Impulse-Type Display Device

A display device of this type emits light in a very short time during a frame period. Hence, the temporal imbalance of light intensity is large, and flicker synchronous with the frame rate is observed. However, movement blurring in pursuit is rarely observed. It is therefore possible to obtain a resolution almost equal to that of a still portion.

In general, the light emission period of a display device changes depending on the display method and display device. The above-described types (1) and (2) are quite different in terms of the light emission period. The longer the light emission period (corresponding to the hold time) is in each method, the larger the movement blurring in pursuit. The shorter the light emission period is, the smaller the movement blurring. That is, the light emission period and the magnitude of moving blurring are almost proportional to each other. On the other hand, concerning flicker synchronous with a frame, the longer the light emission period is, the smaller the flicker observed. The shorter the light emission period is, the larger the observed flicker. That is, the light emission period and flicker have trade-off relationships.

A solution to the two problems is multiplying the frame frequency by N. In many case, N=2. That is, the rate is doubled. When the frame frequency is doubled, the light emission period in each double-rate frame is halved. This also almost halves the movement blurring. Regarding flicker, if an initial frame frequency of 60 Hz is doubled to 120 Hz, the frequency of flicker falls outside the response characteristic of human eyes. Hence, no flicker is observed.

As described above, doubling the frame frequency (more broadly speaking, multiplying the frame frequency by N, where N is greater than 1) has a large effect, but poses a new problem.

For example, when the frame frequency of an original image signal is 60 Hz, the image information is updated every 1/60 sec. If the frame frequency is doubled to display image data at 120 Hz, necessary image information is missing every other frame. As a solution, identical images are displayed, for example, twice if the frame frequency is doubled. This eliminates flicker but cannot improve movement blurring in the original image. In an impulse-type display device, double images are observed by pursuit (this phenomenon will be referred to as "double-blurring").

Two methods are mainly used to double the frame frequency.

The first method detects the motion of an object in an original image and estimates images between two frames. This is generally called an intermediate image generation method by motion compensation. This method is disclosed in, for example, Japanese Patent Laid-Open Nos. 2004-159294 and 2004-297719.

In the second method, first, a filter process is performed for each frame of an input image to separate a spatial high-frequency component associated with movement blurring and a spatial low-frequency component associated with flicker. The spatial high-frequency component is concentrated to one sub-frame (one of the two double-rate frames corresponding to the original frame). The spatial low-frequency component is distributed to both sub-frames (both of the two double-rate frames corresponding to the original frame).

In this specification, this method will be called a "method of separating an image into spatial frequencies and distributing them to sub-frames for display".

The "method of separating an image into spatial frequencies and distributing them to sub-frames for display" is discussed in Japanese Patent Laid-Open Nos. 6-70288 and 2002-351382, and U.S. Pre-Granted Publication No. 2006/0227249A1.

However, the first and second methods have the following problems.

The first method has two problems. As one problem, an error may occur in vector calculation as a result of motion detection, and no means for correcting it is present (to be referred to as problem 1-1). The other problem is that the calculation amount becomes enormous in accordance with the image size (to be referred to as problem 1-2).

The second method also has two problems. As the first problem, since an image displayed by a first sub-frame and that displayed by a second sub-frame do not correctly reflect the display time difference between them, a pursuit image is distorted (problem 2-1). The second problem is caused by moving a component (actually, spatial high-frequency component) of one sub-frame to the other sub-frame. More specifically, this more easily saturates the sub-frame, and the effective dynamic range consequently becomes narrower than the proper dynamic range of the display device (problem 2-2).

SUMMARY OF THE INVENTION

The present invention has been made in consideration of the above-described problems, and has as its object to provide a technique which mitigates one or more of the above-described problems by a simple arrangement.

In order to solve the problems, for example, an image processing apparatus of the present invention has the following arrangement.

The present invention in its first aspect provide an image processing apparatus which inputs moving image data containing m frames per unit time and outputs moving image data containing 2m frames per unit time, comprises an input unit which inputs image data of each frame; a filter unit which generates at least high-frequency emphasized image data from the image data input by the input unit; an inter-frame interpolation unit which detects a motion between the input current frame and an immediately preceding input frame and generates motion-compensated low-frequency image data located at an intermediate position in point of time between the input current frame and the immediately preceding frame; and an output unit which outputs, as a double-rate frame, each of the high-frequency emphasized image data of the immediately preceding input frame and the low-frequency image data generated by the inter-frame interpolation unit.

The present invention in its second aspect provide an image processing apparatus which inputs moving image data containing m frames per unit time and outputs moving image data containing Nm frames per unit time, comprises an input unit which inputs image data of each frame; a filter unit which generates high-frequency emphasized image data and low-frequency image data from the image data input by the input unit; a reduction unit which generates reduced image data from the low-frequency image data; a storage unit which stores the reduced image data obtained by the reduction unit; a motion detection unit which detects motion vector data of each pixel between the reduced image data of the frame obtained by the reduction unit and the reduced image data of the immediately preceding frame stored in the storage unit; a motion vector interpolation unit which generates motion vector data corresponding to an image having a size before the reduction by the reduction unit by spatially interpolating the motion vector of each pixel obtained by the motion detection unit; a motion compensation unit which generates, on the basis of the motion vector data obtained by the motion vector interpolation unit, (N−1) low-frequency image data located at an intermediate position in point of time between the low-frequency image data of the input frame, which is generated by the filter unit, and the low-frequency image data of the immediately preceding frame; and an output unit which outputs, as a double-rate sub-frame, each of the high-frequency emphasized image data obtained by the filter unit and the (N−1) low-frequency image data generated by the motion compensation unit every time one frame input by the input unit is input.

The present invention in its third aspect provide an method of controlling an image processing apparatus which inputs moving image data containing m frames per unit time and outputs moving image data containing 2m frames per unit time, the method comprises an inputting step of inputting image data of each frame; a filtering step of generating at least high-frequency emphasized image data from the image data input in the inputting step; an inter-frame interpolating step of detecting a motion between the input current frame and an immediately preceding input frame and generating motion-compensated low-frequency image data located at an intermediate position in point of time between the input current frame and the immediately preceding frame; and an outputting step of outputting, as a double-rate frame, each of the high-frequency emphasized image data of the immediately preceding input frame and the low-frequency image data generated in the inter-frame interpolating step.

The present invention in its fourth aspect provide an method of controlling an image processing apparatus which inputs moving image data containing m frames per unit time and outputs moving image data containing Nm frames per unit time, the method comprises an inputting step of inputting image data of each frame; a filtering step of generating high-frequency emphasized image data and low-frequency image data from the image data input in the inputting step; a reducing step of generating reduced image data from the low-frequency image data; a storing step of storing the reduced image data obtained in the reducing step; a motion detecting step of detecting motion vector data of each pixel between the reduced image data of the frame obtained in the reducing step and the reduced image data of the immediately preceding frame stored in the storing step; a motion vector interpolating step of generating motion vector data corresponding to an image having a size before the reduction in the reducing step by spatially interpolating the motion vector of each pixel obtained in the motion detecting step; a motion compensating step of generating, on the basis of the motion vector data obtained in the motion vector interpolating step, (N−1) low-frequency image data located at an intermediate position in point of time between the low-frequency image data of the input frame, which is generated in the filtering step, and the low-frequency image data of the immediately preceding frame; and an outputting step of outputting, as a double-rate sub-frame, each of the high-frequency emphasized image data obtained in the filtering step and the (N−1) low-frequency image data generated in the motion compensating step every time one frame input in the inputting step is input.

According to the present invention, it is possible to, for example, reduce movement blurring in a hold-type display device and reduce flicker in an impulse-type display device by a simple process. It is also possible to suppress distortion such as ghost or tail-blurring in pursuit. Additionally, it is possible to prevent any adverse effect on image quality caused by a decrease in brightness or saturation of the level of one sub-frame.

Further features of the present invention will become apparent from the following description of exemplary embodiments with reference to the attached drawings.

BRIEF DESCRIPTION OF THE DRAWINGS

FIG. 10 is a timing chart showing the transition of brightness of sub-frames SH and SL in a hold-type display device that employs the arrangement in FIG. 9.

FIG. 11 is a timing chart showing the frame display timing of a conventional hold-type display device.

FIG. 12 is a timing chart showing the frame display timing of an impulse-type display device that employs the arrangement in FIG. 9.

FIG. 13 is a timing chart showing the frame display timing of a conventional impulse-type display device.

DESCRIPTION OF THE EMBODIMENTS

Embodiments of the present invention will now be described in detail with reference to the accompanying drawings.

The embodiments propose a method of combining the first and second methods described above and the condition of the combination. In the above-described "spatial frequency separation method", a sub-frame which emphasizes and displays a spatial high-frequency component is defined as a first sub-frame, and the other sub-frame is defined as a second sub-frame. In the embodiments, the image displayed by the first sub-frame is generated based on a spatial high-frequency component and a spatial low-frequency component extracted from a single frame of a corresponding input image. The image displayed by the second sub-frame is a spatial low-frequency component generated by estimating motion from the spatial low-frequency components of or near the preceding and succeeding frames and compensating for it.

For easy understanding of the embodiments of the present invention, prior art arrangements will first be described with reference to FIGS. 5 to 8.

[Explanation of the Prior Art]

Figure 5:
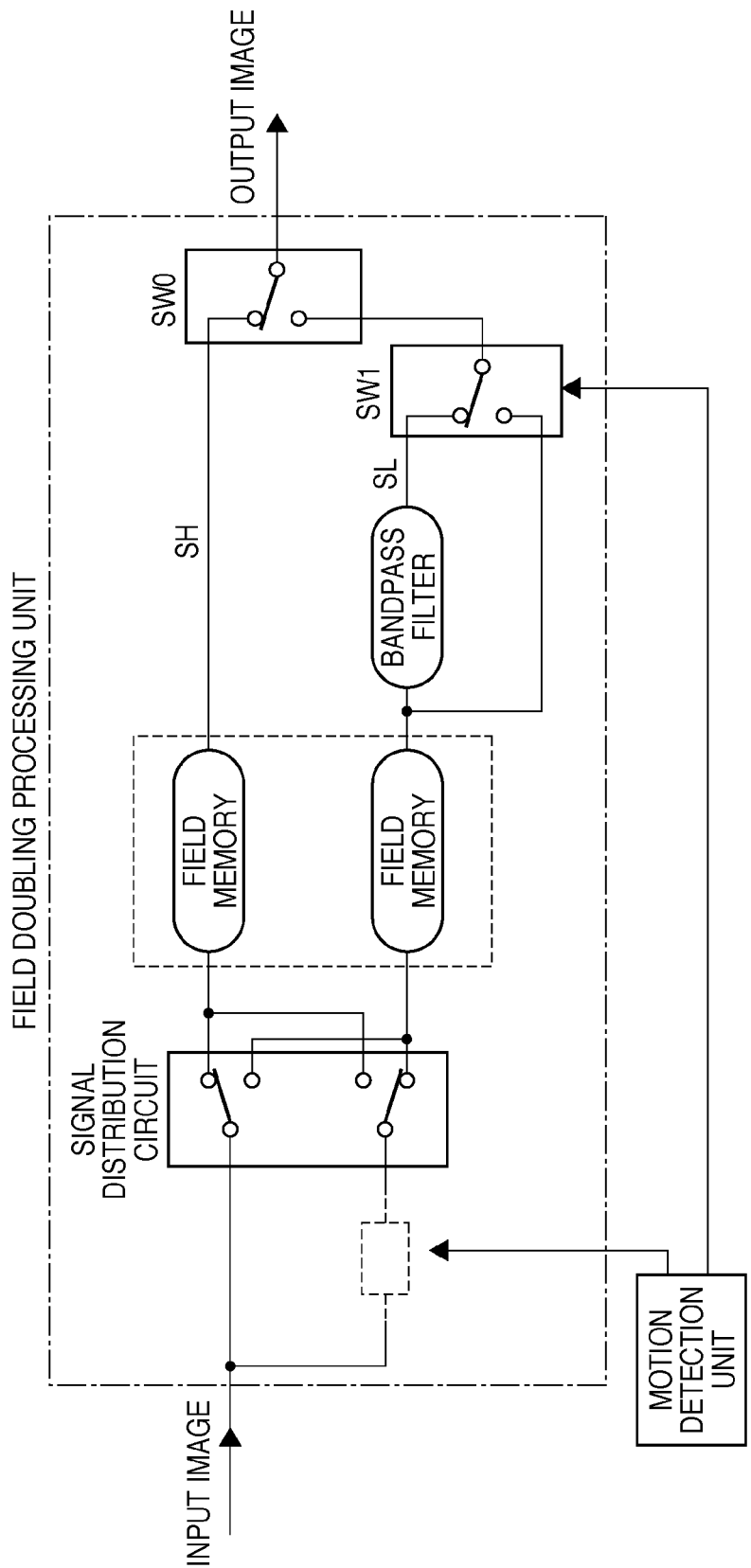
FIG. 5 is a block diagram showing the arrangement of a conventional image processing apparatus.
Figure 6:
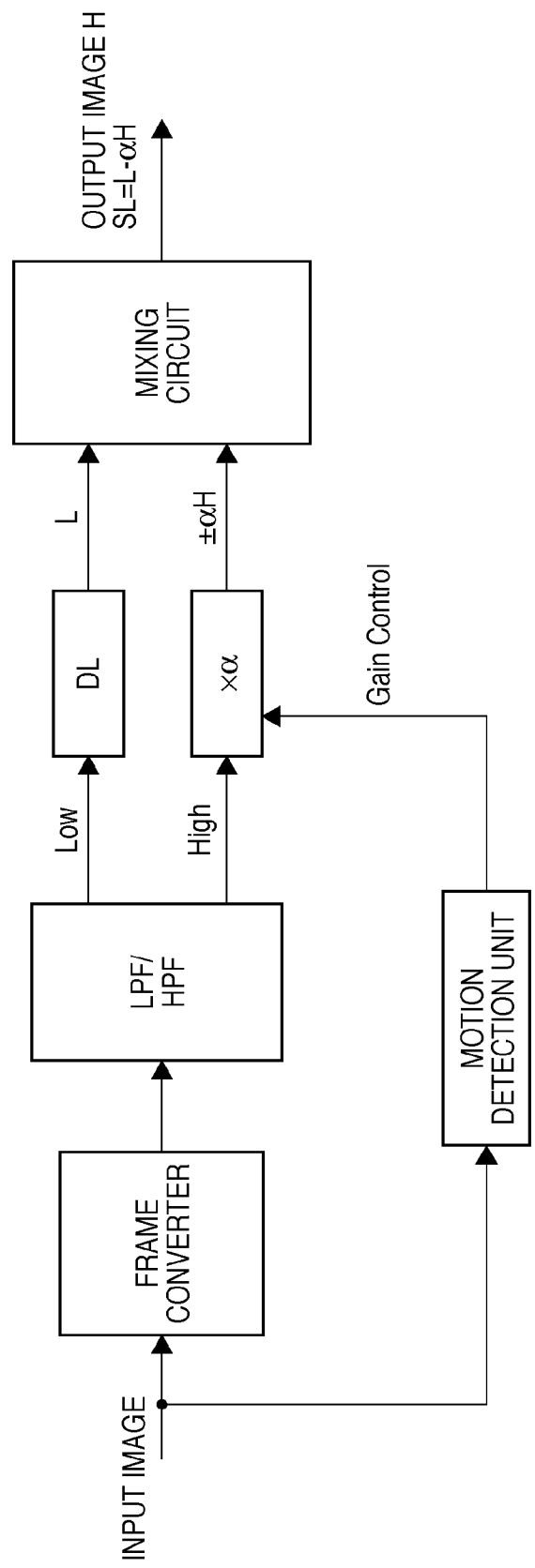
FIG. 6 is a block diagram showing the arrangement of another conventional image processing apparatus.
Figure 7:
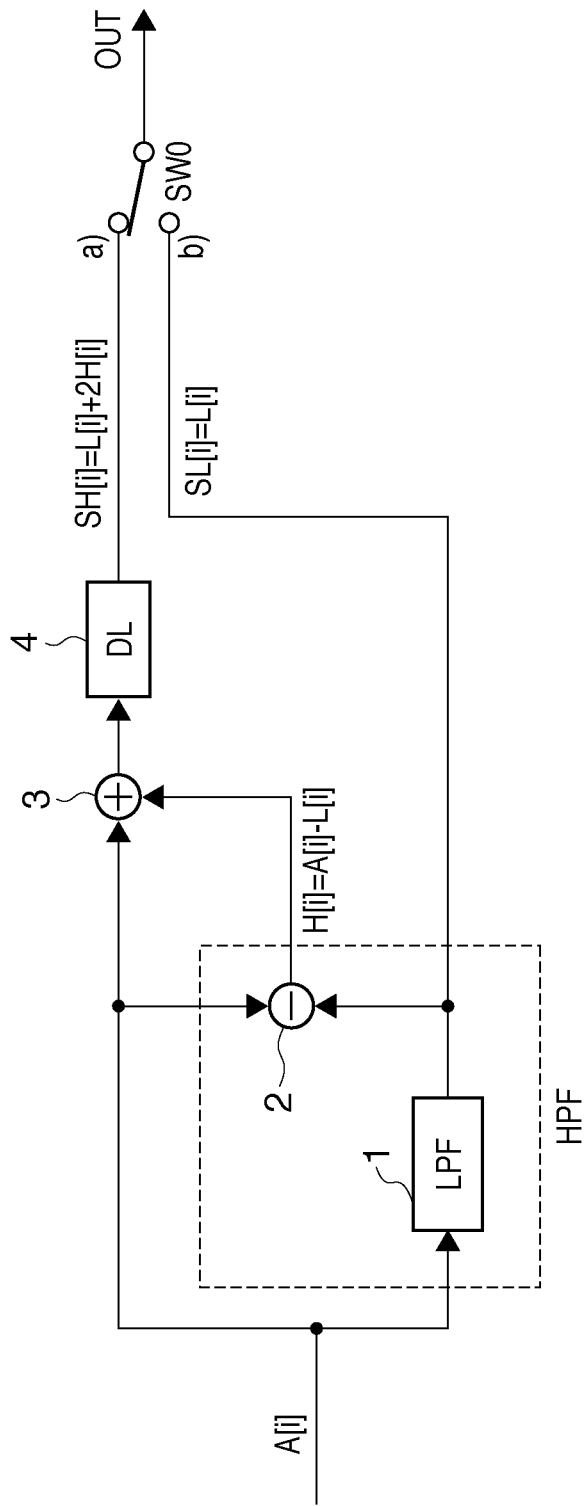
FIG. 7 is a block diagram showing the arrangement of another conventional image processing apparatus.
Figure 8:
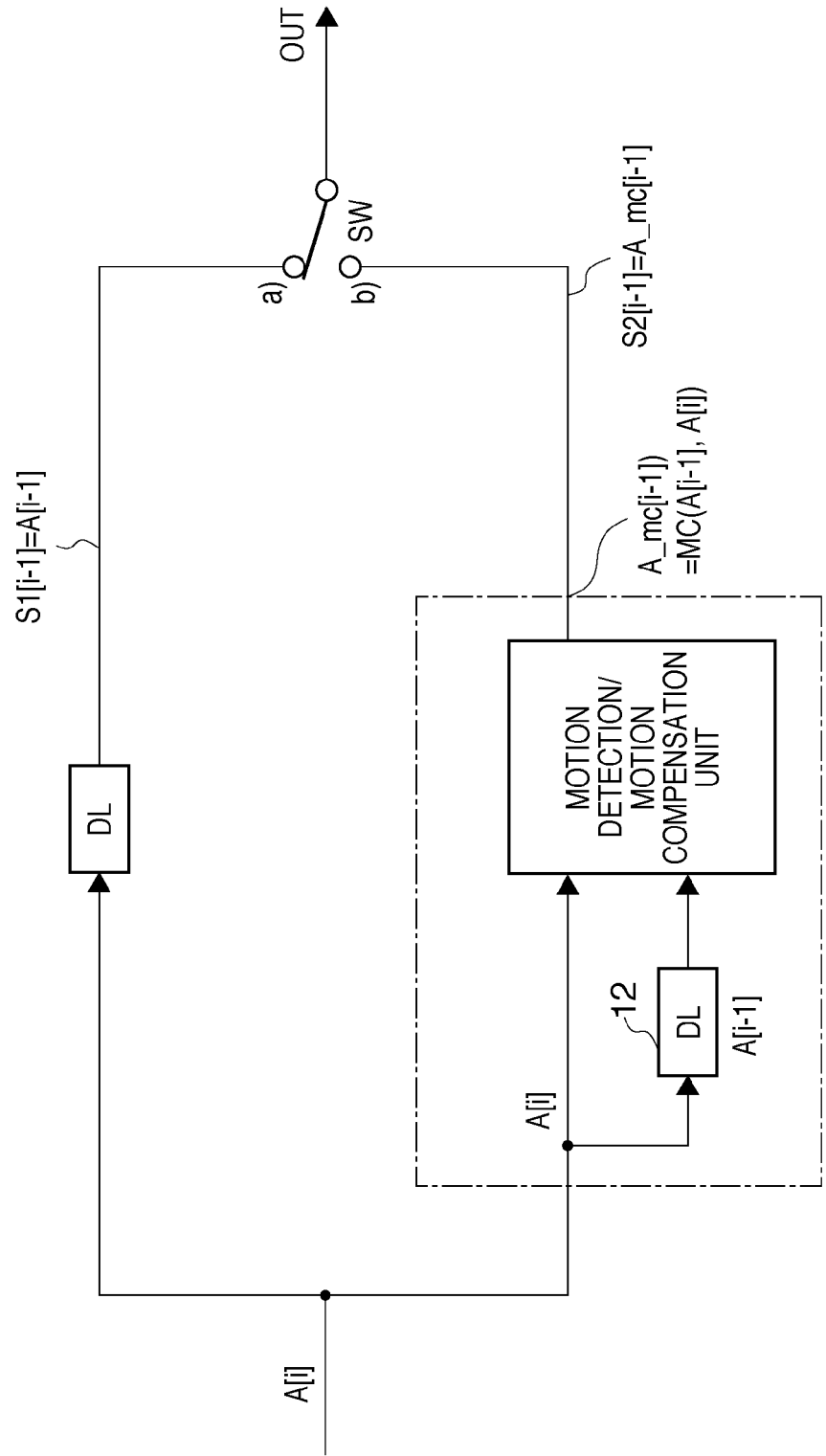
FIG. 8 is a block diagram showing the arrangement of yet another conventional image processing apparatus.

FIG. 8 shows an apparatus arrangement which most simplifies the above-described first method, that is, "frame interpolation method by motion compensation". FIGS. 5 to 7 show three conventional apparatus arrangements related to the above-described second method, that is, "spatial frequency separation method". Each of the prior art arrangement shown in FIG. 8 and those shown in FIGS. 5 to 7 will be described below.

<Explanation of First Method>

FIG. 8 shows an apparatus arrangement for the first method. This apparatus detects the motion of an object in an input image and estimates and calculates images between two frames.

Referring to FIG. 8, the frame frequency of an input image (input frame of interest) A[i] is, for example, 60 Hz. A switch SW alternately selects the input terminals every $\frac{1}{120}$ sec so that two sub-frames (first and second sub-frames) are output in correspondence with one input frame.

An image S1 of the first sub-frame is the same as the input image. An image S2 of the second sub-frame is an intermediate image obtained by executing motion compensation based on the frames before and after the input image.

The above-described problem 1-1 of this method is that a certain estimation error occurs in motion detection depending on the image. Additionally, a motion-compensated image based on the erroneous estimation is output as the image S2 without being corrected. The problem 1-2 means that a high-speed arithmetic process, including motion compensation, and a high-speed memory with a sufficient capacity are necessary because the calculation scale of motion detection itself is large.

<Explanation of Second Method>

FIG. 5 is a block diagram showing the arrangement of an apparatus for executing a process according to the above-described second method. In this case as well, the frame rate of an input image is 60 Hz. Every time one frame is input, two sub-frames are generated and output. To do this, the input image of one frame is temporarily saved in two field memories. A switch SW0 alternately selects the inputs every $\frac{1}{120}$ second to double the frame rate of the image. A bandpass filter is arranged in the generation process of one sub-frame (second sub-frame). A switch SW1 alternately selects the image that has passed through the bandpass filter and the image without the filtering process in accordance with the detection result of the motion detection unit.

As a result, one sub-frame (SL in FIG. 5) contains a relatively small amount of high-frequency component. The other sub-frame (SH in FIG. 5) contains a larger amount of spatial high-frequency component as compared to the sub-frame SL. Consequently, the spatial high-frequency component is localized in one sub-frame of the output image. This improves movement blurring in pursuit. Additionally, since the spatial low-frequency component is distributed to two sub-frames, flicker at the frame frequency can be prevented.

FIG. 6 is a block diagram showing the arrangement of another conventional apparatus. Referring to FIG. 6, the frame rate of an input image is 60 Hz. A frame converter doubles the rate of the input frame of the image and outputs it to an LPF (low pass filter)/HPF (high pass filter) filter unit. The LPF/HPF filter unit generates spatial low-frequency component data "Low" and spatial high-frequency component data "High". The high-frequency component data is multiplied by a predetermined gain α. The gain α changes the positive/negative polarity in accordance with the output timings of the two sub-frames. If the motion detection unit has detected motion, the multiplier sets the gain α to a large value. If the motion detection unit has detected no motion, the multiplier sets the gain α to a small value. At the output timing of the first sub-frame, a mixing circuit adds the low-frequency component data "Low" to the multiplication result using a positive gain α and outputs the sum. At the output timing of the second sub-frame, the mixing circuit adds the low-frequency component data "Low" to the multiplication result using a negative gain α and outputs the sum.

As a result, the spatial high-frequency component is localized in one double-rate frame (or one sub-frame viewed from the input image) SH. This improves movement blurring in pursuit. Additionally, since the spatial low-frequency component is distributed to two sub-frames, flicker at the frame frequency can be prevented.

FIG. 7 shows another prior art arrangement. Referring to FIG. 7, an input image A[i] of one frame passes through a lowpass filter (LPF) and a subtractor to generate high-frequency component data H[i]. The high-frequency component data H[i] is added to the input image data to generate high-frequency emphasized image data SH[i].

Every time image data of one frame is input, a switch SW0 alternately selects the two input terminals. As a result, every time one frame is input, two sub-frames or the high-frequency emphasized image data SH[i] and low-frequency image data SL[i] are generated and output. Note that i of A[i] indicates the ith frame.

This allows outputting a double-rate image containing a spatial high-frequency component concentrated to one of the double-rate frames. This improves movement blurring in pursuit. Additionally, since the spatial low-frequency component is distributed to two sub-frames, flicker of the frame frequency can be prevented.

The prior art arrangements of the second method have been described. Each of the arrangements shown in FIGS. 5 to 7 alternately output the high-frequency emphasized image data SH and the low-frequency image data SL based on input image data of one frame every time it is input. When the frame frequency of the input image is about 50 or 60 Hz, the images SH and SL are recognized as time-integrated, that is, added waveform on the human retina. However, in pursuing a moving object, the time factor of the image movement is added.

We assume that the frame frequency of the input image is 60 Hz, and examine a case in which images SH[i] and SL[i] are output and displayed in this order in correspondence with the ith frame of the input image. In this case, the image SL[i] is displayed 1/120 sec later than the image SH[i]. For this reason, in pursuing a moving object, the image SL[i] is recognized at a relatively shifted position, and the observed image contains distortion such as overshoot, ghost, or tail-blurring. Note that tail-blurring is a kind of distortion that draws a trail before or after an edge of an object in pursuit. In the arrangements shown in FIGS. 5 to 7, asymmetrical distortion occurs at the leading and trailing edges in the object moving direction.

<Explanation of Problem 2-1 (Waveform Distortion) in "Spatial Frequency Separation Method">

For descriptive convenience, reasons why distortion occurs in a waveform observed by pursuit will be described with reference to FIGS. 19A to 19D to FIGS. 23A to 23C assuming the conventional apparatus in FIG. 7.

The frame rate of the input image is 60 Hz. The moving speed of an object as the pursuit target is V pixels per 1/60 sec. That is, the object moving speed is V [pixel/(1/60 sec)].

Figure 19A:
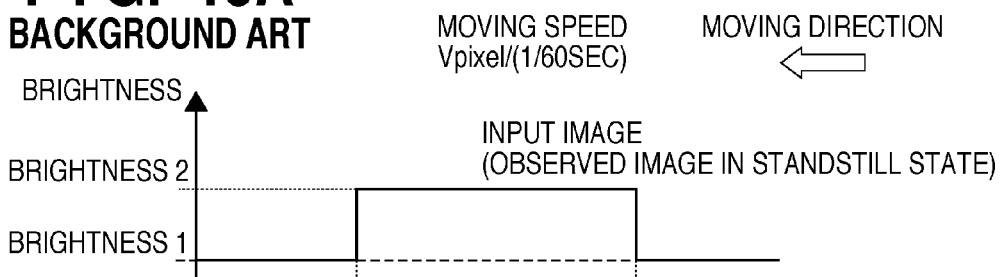
FIGS. 19A to 19D are views for explaining why distortion occurs in a waveform observed by pursuit in a conventional device.
Figure 19B:
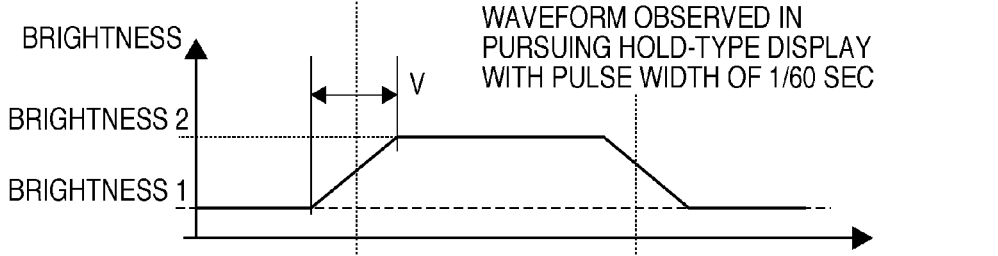
Figure 19C:
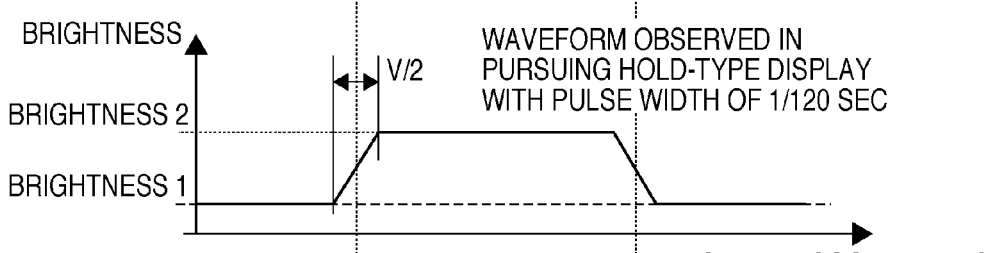
Figure 19D:
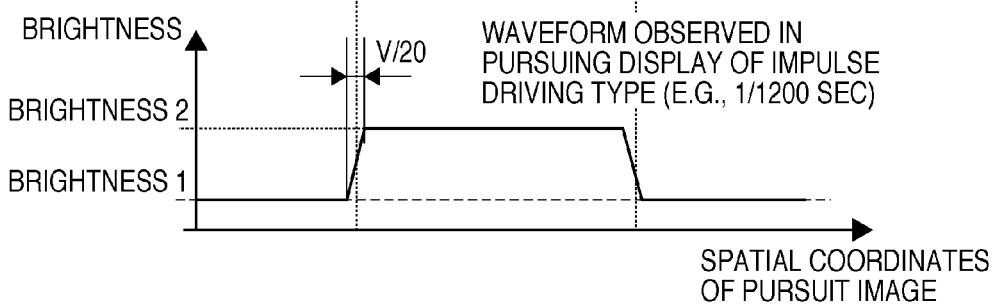

FIGS. 19A to 19D are views showing the relationship between the display pulse width (the time length of the display period) and the pursuit waveform. FIG. 19A shows the sectional waveform of the original still image. FIG. 19B shows a sectional waveform at a display pulse width of 1/60 sec. FIG. 19C shows a sectional waveform at a display pulse width of 1/120 sec. FIG. 19D shows a sectional waveform at a display pulse width of 1/1200 sec. In any case, the width of each tilted portion corresponds to movement blurring in the pursuit image.

The width of a tilted portion is given by Tp (pulse width)×V (moving speed).

The range (number of pixels) of the image blurred by movement is represented by Tp [sec]×V [pixel/(1/60 sec)].

For example, when an image having a frame rate of 60 Hz is displayed using a hold-type display device, Tp=(1/60) sec. Hence, as indicated by the waveform in FIG. 19B, a range corresponding to V [pixel] appears as a blur.

When an image having a frame rate of 120 Hz is displayed using a hold-type display device, Tp=1/120. Hence, as indicated by the waveform in FIG. 19C, the area that appears as a blur is V/2 [pixel].

In an impulse-type display device such as a CRT, the pulse width is short, and for example, Tp=1/1200 sec. In this case, as shown in FIG. 19D, the area that appears as a blur is V/20 [pixel].

Note that movement blurring is determined not by the frame rate but by only the display pulse width and the object moving speed. "Movement blurring" here is different from that caused by the response characteristic of a display device.

A waveform obtained when an original image A is separated by the spatial frequency will be described next with reference to FIGS. 20A to 20C. Letting LPF( ) be the function of a spatial lowpass filter, spatial low-frequency component data L extracted from the input image A is L=LPF(A), and spatial high-frequency component data H is H=A−LPF (A). The low-frequency component data L is image data, which is represented by SL. On the other hand, high-frequency emphasized image data is represented by SH. The high-frequency emphasized image data SH is the sum of the original image A and the high-frequency component data H. Hence, SH=A+H=A+A−LPF(A)=2A−L. When the high-frequency component data H is added to the low-frequency component data, the original image can be constructed. For this reason, the high-frequency emphasized image data can also be expressed by SH={H+L}+H=2H+L.

Figure 20A:
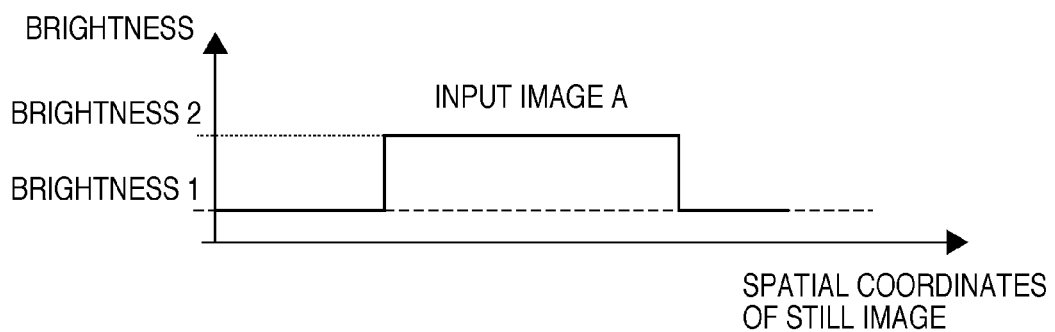
FIGS. 20A to 20C are views for explaining why distortion occurs in a waveform observed by pursuit in a conventional device.
Figure 20B:
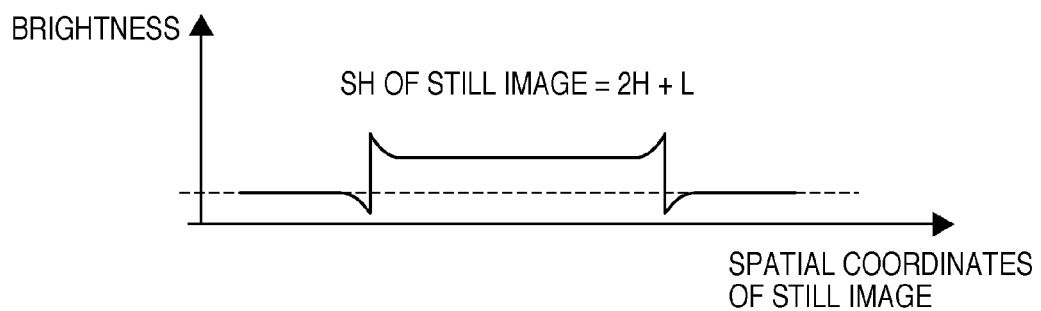
Figure 20C:
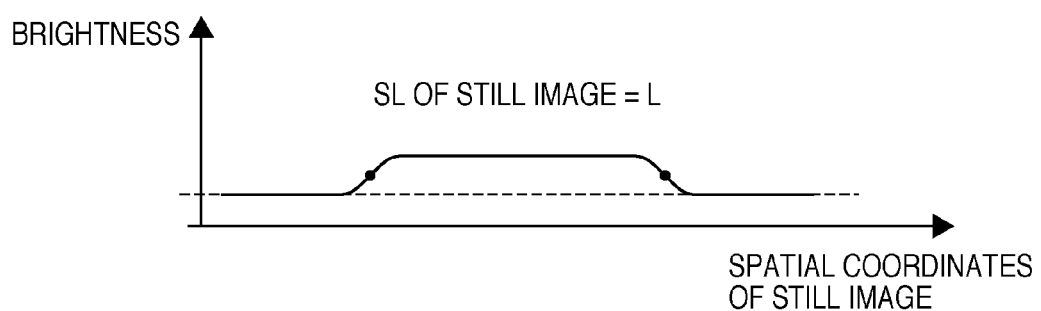

FIGS. 20A to 20C show the sectional waveforms of still images. FIG. 20A shows the sectional waveform of the original image. FIG. 20B shows the sectional waveform of the high-frequency image SH (=2H+L). FIG. 20C shows the sectional waveform of the low-frequency image SL. When the waveform in FIG. 20B is added to that in FIG. 20C, the waveform in FIG. 20A is obtained.

Figure 21A:
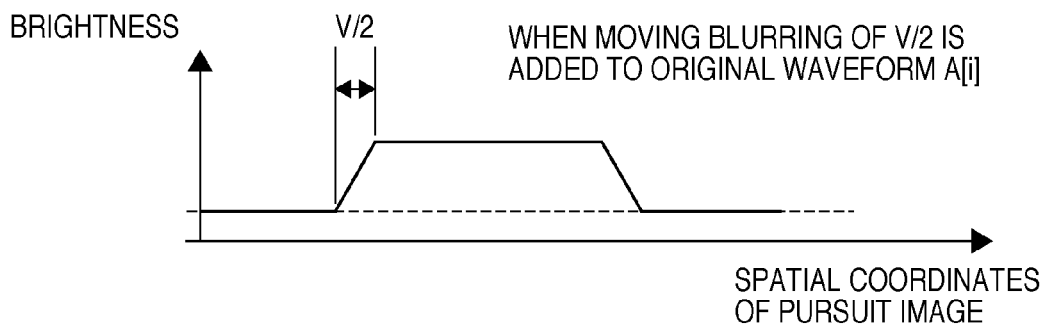
FIGS. 21A to 21C are views for explaining why distortion occurs in a waveform observed by pursuit in a conventional hold-type display device.
Figure 21B:
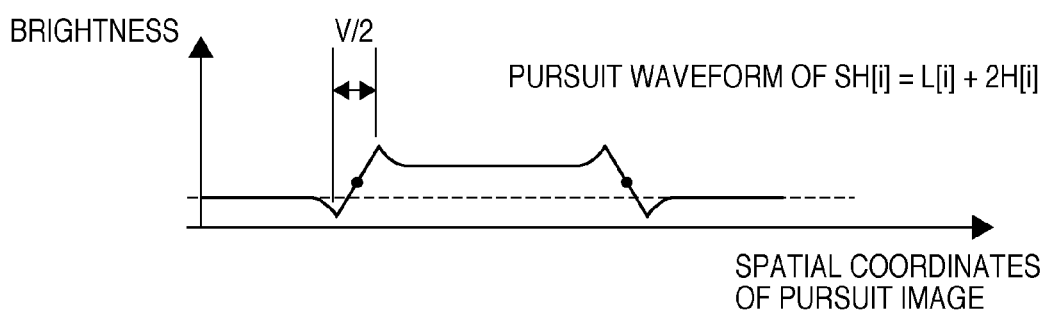
Figure 21C:
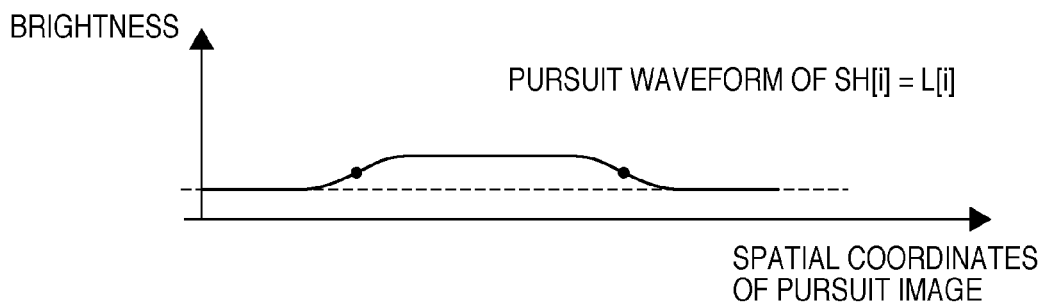

FIGS. 21A to 21C show waveforms in double-rate hold-type display or pursuit image waveforms obtained by adding movement blurring corresponding to the display pulse width (pulse width of 1/120 sec) to the waveforms shown in FIGS. 20A to 20C. When a blur corresponding to V/2 (i.e., the movement blurring amount) is added to the left and right sides of the waveforms in FIGS. 20A to 20C, the waveforms shown in FIGS. 21A to 21C are obtained.

Figure 25A:
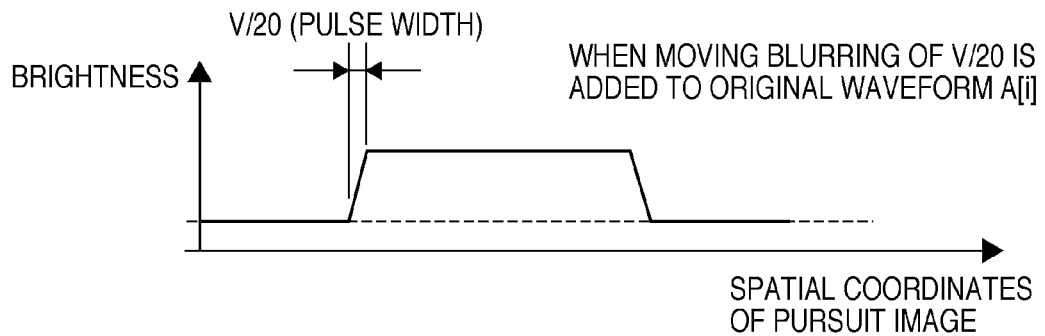
FIGS. 25A to 25C are views for explaining why distortion occurs in a waveform observed by pursuit in a conventional impulse-type display device.
Figure 25B:
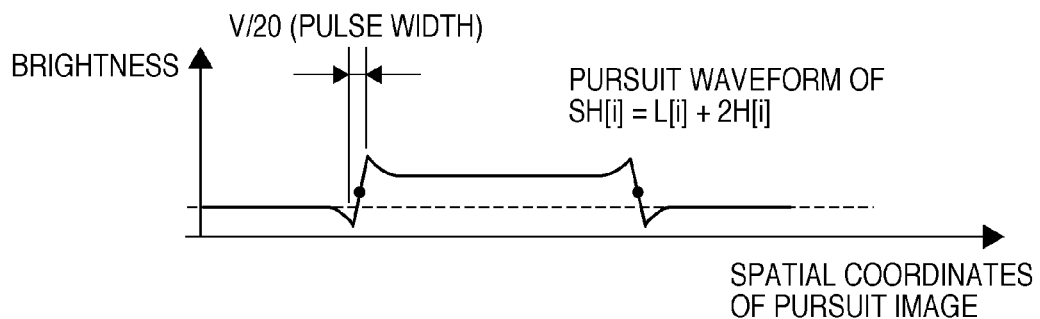
Figure 25C:
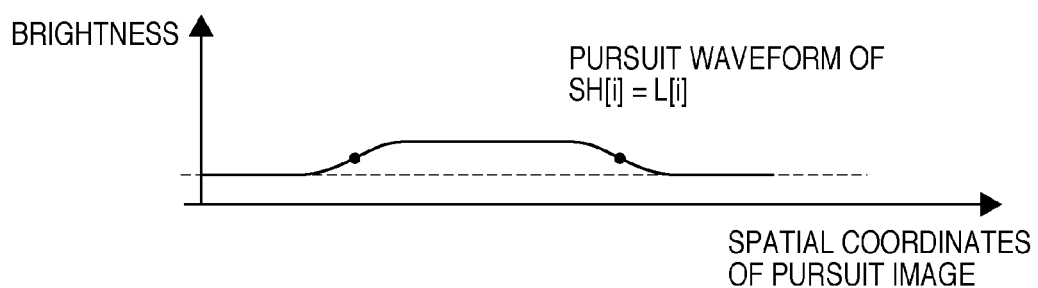

FIGS. 25A to 25C show waveforms in impulse-type display or pursuit image waveforms obtained by adding movement blurring corresponding to the display pulse width of 1/1200 sec to the waveforms shown in FIGS. 20A to 20C. When a blur corresponding to V/20 (i.e., the movement blurring amount) is added to the left and right sides of the waveforms in FIGS. 20A to 20C, the waveforms shown in FIGS. 25A to 25C are obtained.

Figure 22A:
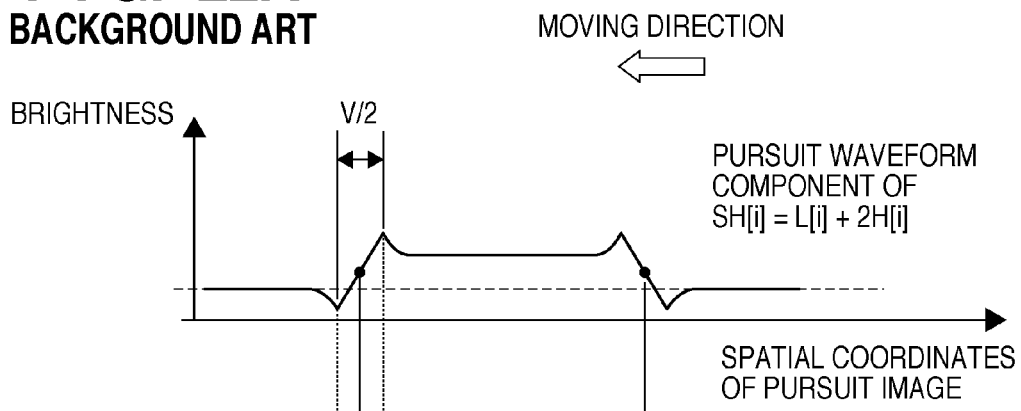
FIGS. 22A to 22C are views for explaining why distortion occurs in a waveform observed by pursuit in a conventional hold-type display device.
Figure 22B:
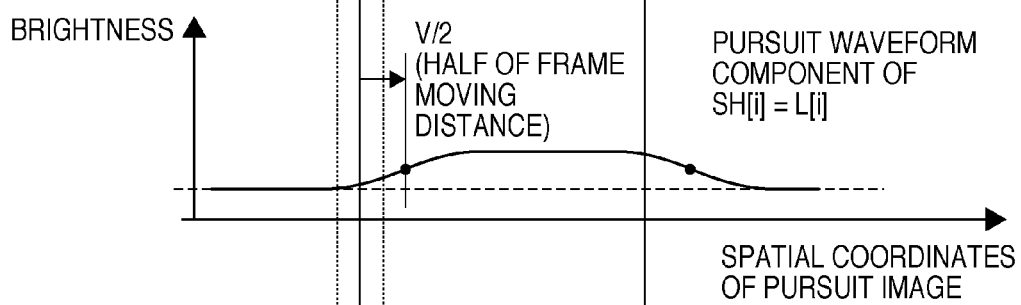
Figure 22C:
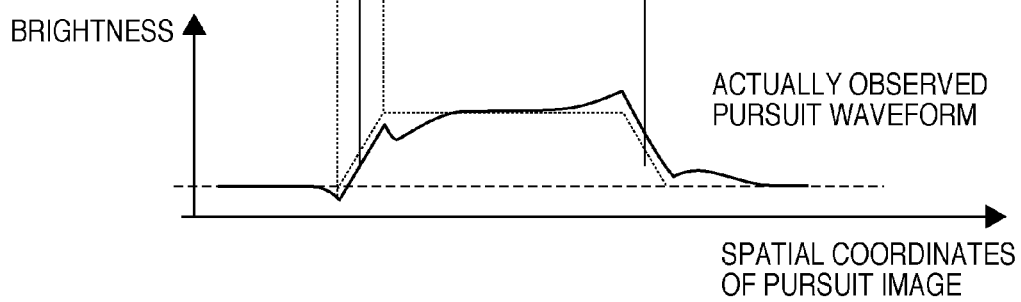

FIGS. 22A to 22C show pursuit waveforms in the arrangement shown in FIG. 7 using double-rate hold-type display. In FIG. 7, the high-frequency emphasized image SH[i] and the low-frequency image SL[i], which are generated from a single frame of the input image, are displayed with a time lag of 1/120 sec. That is, the low-frequency image SL[i] is displayed (output) 1/120 sec later than the high-frequency emphasized image SH[i]. For this reason, in the pursuit waveform, the waveform of the image SL[i] is observed with a shift of V/2 in a direction opposite to the moving direction, as compared to the waveform of the image SH[i]. The thus formed pursuit waveform of the image SL in FIG. 22B is added to that of the high-frequency emphasized image data SH in FIG. 22A, the waveform shown in FIG. 22C is obtained. As is apparent from the waveform in FIG. 22C, distortion such as overshoot and tail-blurring occurs in the image. In particular, the distortion is noticeably asymmetrical in the moving direction.

Figure 26A:
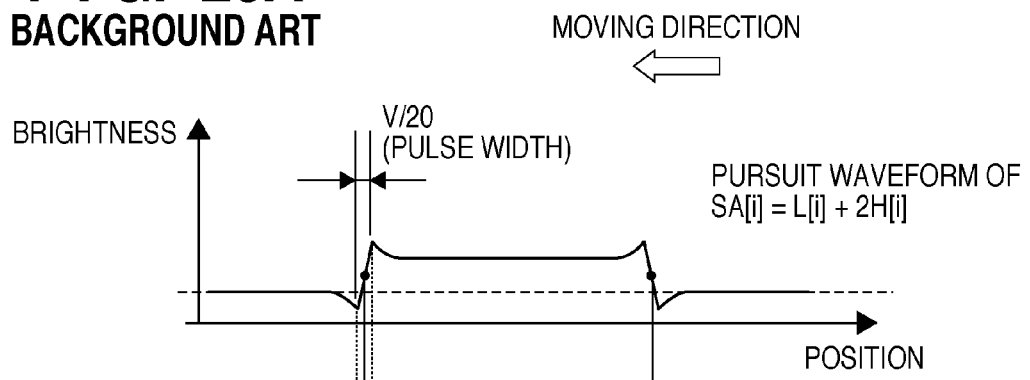
FIGS. 26A to 26C are views for explaining why distortion occurs in a waveform observed by pursuit in a conventional impulse-type display device.
Figure 26B:
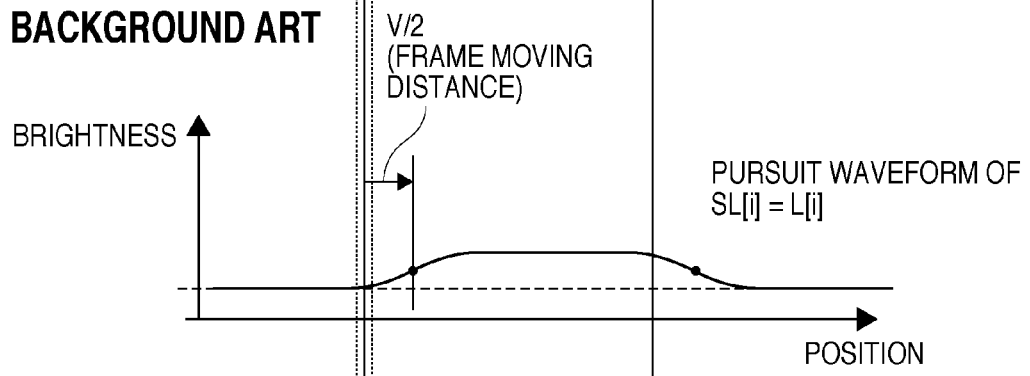
Figure 26C:
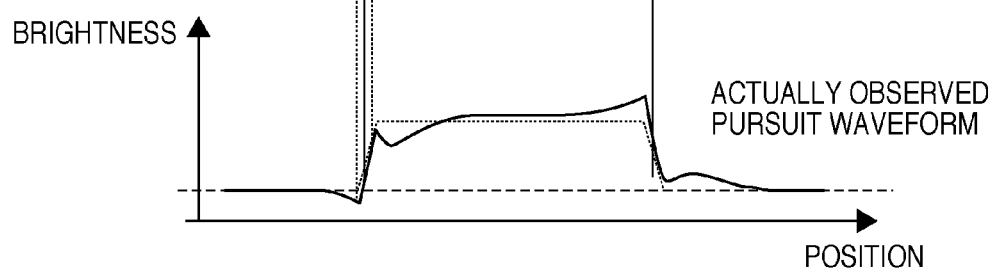

FIGS. 26A to 26C show pursuit waveforms in the arrangement shown in FIG. 7 using impulse-type display. Like the above case, in the pursuit waveform, the waveform of the image SL[i] is observed with a shift of V/20 in a direction opposite to the moving direction, as compared to the waveform of the image SH[i]. The thus formed pursuit waveform of the image SL in FIG. 26B is added to that of the high-frequency emphasized image data SH in FIG. 26A, the waveform shown in FIG. 26C is obtained. As is apparent from the waveform in FIG. 26C, distortion such as overshoot and tail-blurring occurs in the image. In particular, the distortion is noticeably asymmetrical in the moving direction.

As is apparent from comparison between FIGS. 22A to 22C and FIGS. 26A to 26C, the difference in pulse width largely affects movement blurring, though the influence of the pulse width on distortion such as overshoot or tail-blurring is relatively small.

The arrangements and problems of the prior arts have been described above.

<Explanation of Apparatus in Embodiments>

Figure 9:
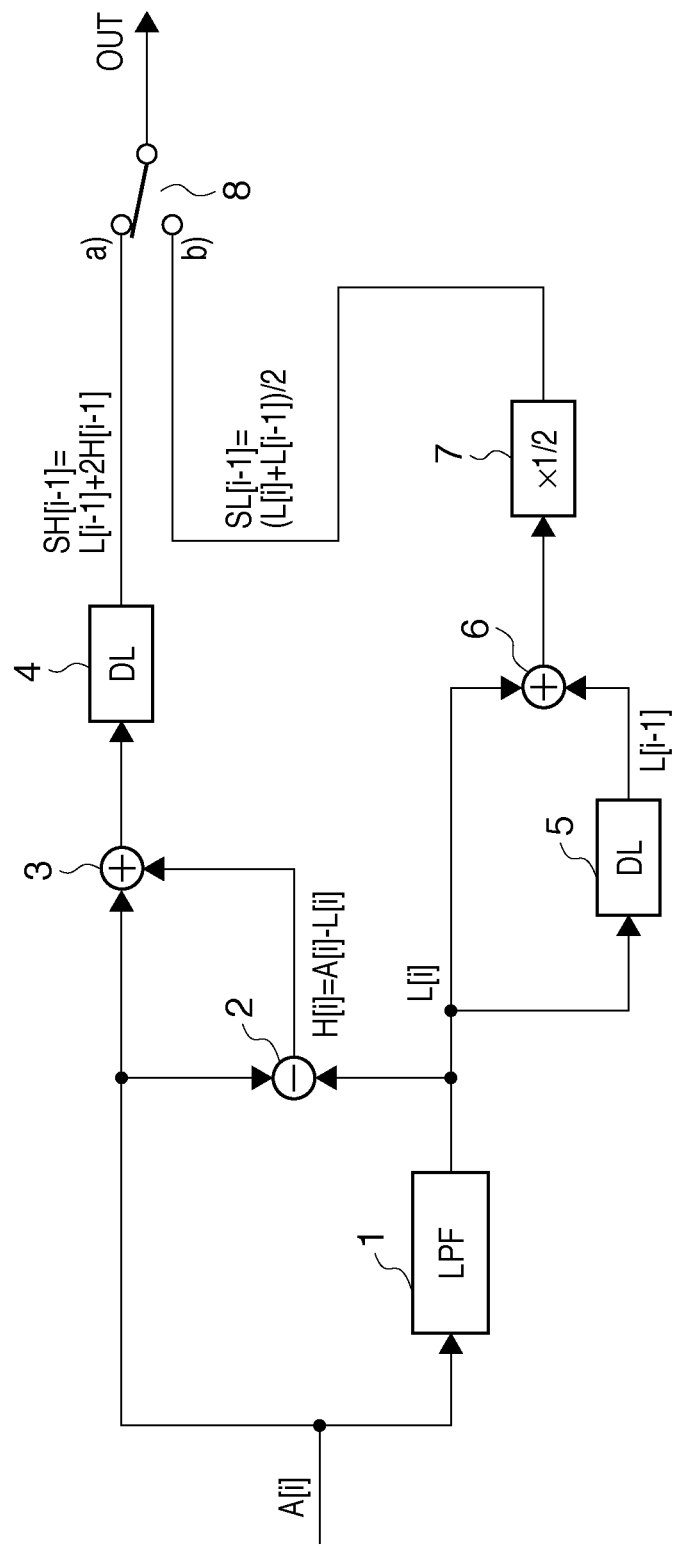
FIG. 9 is a block diagram showing the arrangement of an image processing apparatus in the embodiment.

The present inventor thought that an apparatus arrangement shown in FIG. 9 can solve the above-described problems. A description will be given assuming that the frame rate of the input image is 60 Hz, and it is converted into an image with a double rate of 120 Hz.

A lowpass filter (to be referred to as an LPF) 1 passes the low-frequency component of input image data A[i] of one frame to generate low-frequency component data (low-frequency image data) L[i]. A subtractor 2 subtracts the low-frequency component data L[i] from the input original image A[i] to generate high-frequency component data H[i]. An adder 3 adds the high-frequency component data H[i] to the original image A[i]. As a result, the adder 3 outputs high-frequency emphasized image data SH[i] (=A[i]+H[i]=L[i]+2H[i] (=2A[i]−L[i])). The high-frequency emphasized image data SH[i] is supplied to a delay circuit 4 (formed from a FIFO memory or RAM). Consequently, the delay circuit 4 outputs high-frequency emphasized data SH[i−1] of the immediately preceding frame and supplies it to a switch 8. The data of the immediately preceding frame is output to adjust the output timing in accordance with the frame delay of the low-frequency image data.

The low-frequency component data L[i] is supplied to an adder 6 and a delay circuit 5. The adder 6 adds the low-frequency component data L[i] obtained from the current frame A[i] to low-frequency component data L[i−1] generated from an immediately preceding input frame A[i−1]. A divider 7 halves the data output from the adder 6. That is, the adder 6 and the divider 7 calculate the average of the low-frequency component data L[i] of the current frame and the low-frequency component data L[i−1] of the preceding frame. The average value of the low-frequency components is output as low-frequency image data SL[i−1] of the immediately preceding frame with respect to the frame A[i] of interest.

The switch 8 selects input terminals a and b in this order within the input period of one frame of 60 Hz, that is, within the input period of one frame so that the two sub-frames, the high-frequency image data SH and low-frequency image data SL are output as an image having a frame rate of 120 Hz.

Figure 23A:
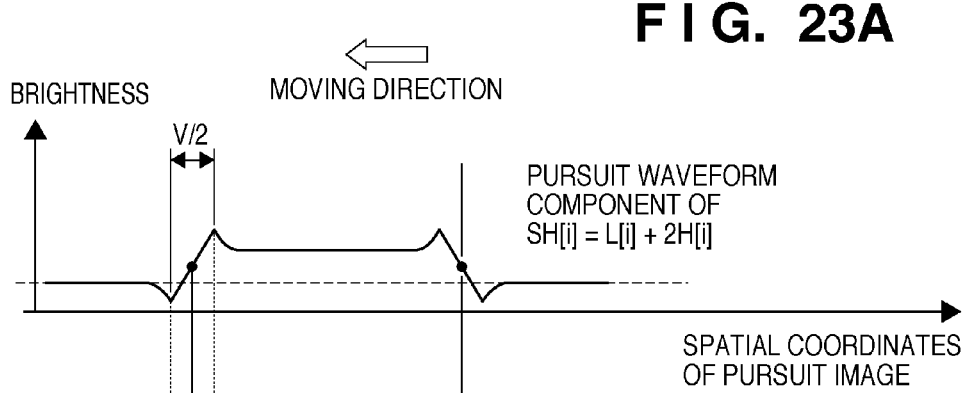
FIGS. 23A to 23C are views for explaining why distortion in a waveform observed by pursuit in a hold-type display device can be suppressed using the arrangement assumed in the present invention.
Figure 23B:
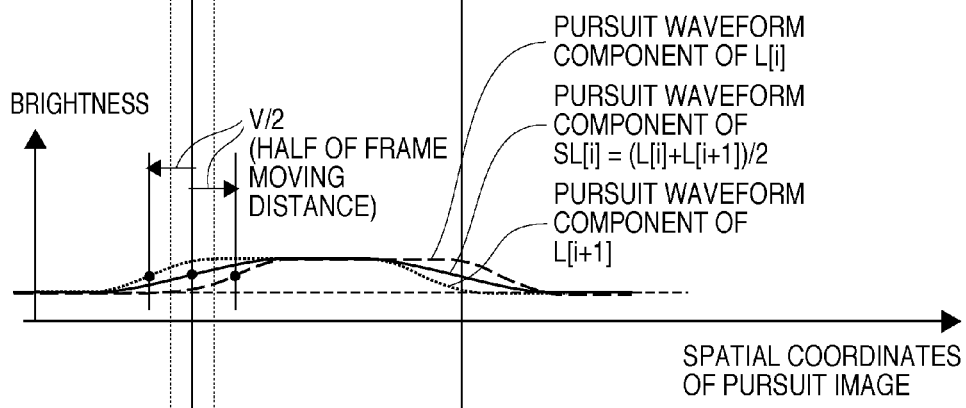
Figure 23C:
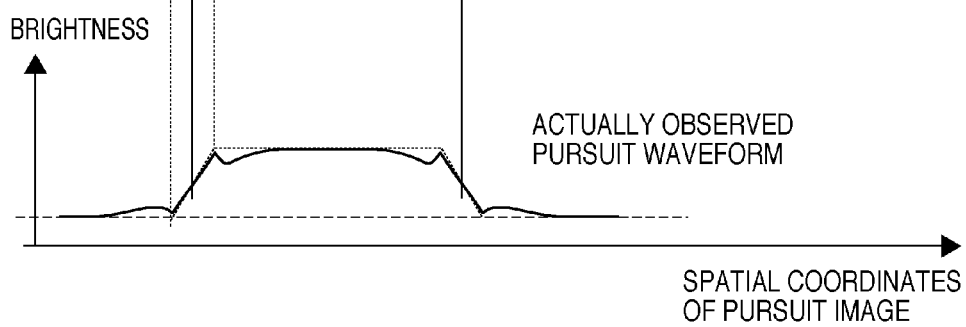
Figure 27A:
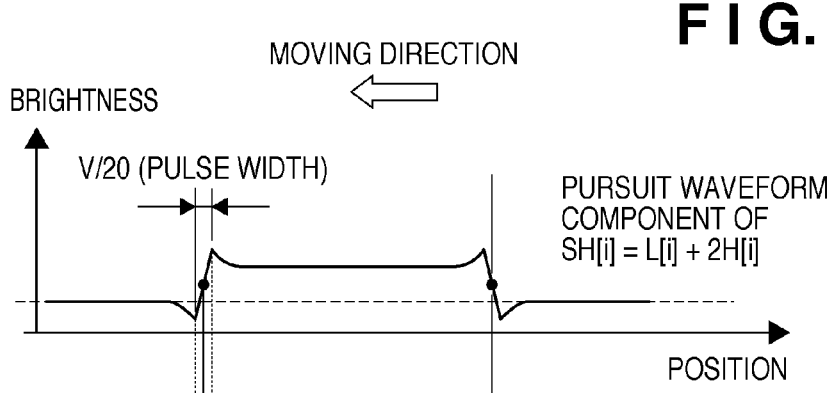
FIGS. 27A to 27C are views for explaining why distortion in a waveform observed by pursuit in an impulse-type display device can be suppressed using the arrangement assumed in the present invention.

FIGS. 23A to 23C and FIGS. 27A to 27C show waveforms obtained by pursuing an image in the arrangement shown in FIG. 9. FIGS. 23A to 23C show the case of a hold-type display device, and FIG. 27A show the case of an impulse-type display device. Note that the high-frequency emphasized image data SH[i] and the low-frequency image data SL[i] have a time difference of 1/120 sec in both cases.

Of the constituent elements of the low-frequency image SL[i] in FIG. 23B, L[i] is an image generated from the same frame as SH[i]. L[i+1] is an image generated from the same frame (i.e., immediately succeeding frame) as SH[i+1]. Hence, L[i] is displayed 1/120 sec later than the timing that should be displayed. On the other hand, L[i+1] is displayed 1/120 sec earlier than the timing that should be displayed. Hence, in the pursuit waveform, the former is observed with a shift of V/2 in the direction opposite to the object moving direction, and the latter is observed with a shift of V/2 in the object moving direction. SL[i] is the waveform of the average value of them. The thus formed waveform in FIG. 23B is added to the pursuit waveform of the high-frequency emphasized image data SH in FIG. 23A, the waveform observed by pursuit in FIG. 23C is obtained. This waveform contains overshoot and tail-blurring but is symmetrical in the moving direction. It is therefore possible to suppress the maximum amplitude of distortion and make it unnoticeable.

Figure 27B:
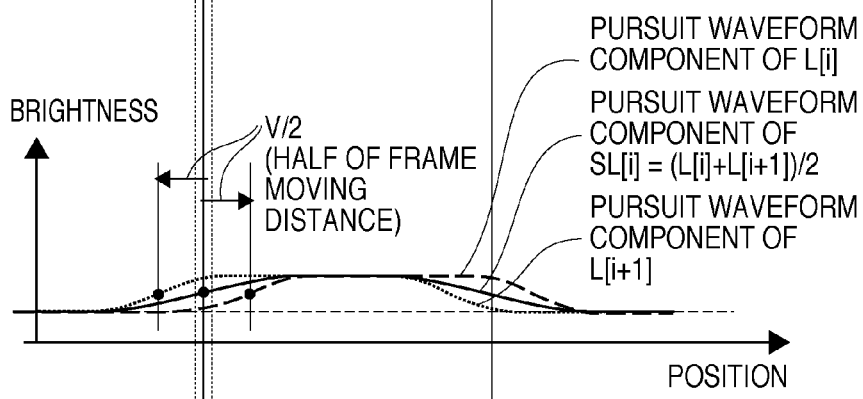
Figure 27C:
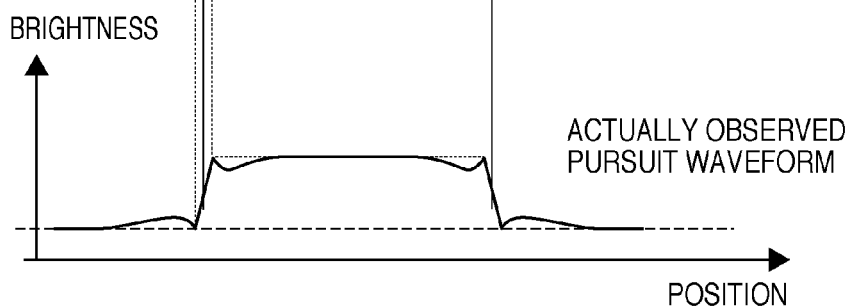

This also applies to FIGS. 27A to 27C. A waveform observed by pursuit in FIG. 27C is obtained. Like the above case, the waveform contains overshoot and tail-blurring but is symmetrical in the moving direction. It is therefore possible to suppress the maximum amplitude of distortion and make it unnoticeable.

In the embodiments of the present invention, calculations and definitions are explained in terms of displayed brightness (displayed light intensity). In the embodiments, a timing chart showing, for example, the waveform of an image expresses brightness along the ordinate. Hence, the present invention is most effective when it is applied to image data defined as data proportional to displayed brightness (displayed light intensity). However, the present invention is not always limited to such a case. The present invention is also applicable to image data in a range generally used (image data having slight nonlinearity between data values and displayed brightness or light intensity). Even in this case, the concept of the present invention approximately holds and provides a beneficial effect.

As described above, the arrangement shown in FIG. 9 can generate image data having a more satisfactory waveform than the prior art. In the present invention, however, another problem (the above-described problem 2-2) caused by the arrangement in FIG. 9, that is, the problem of the narrower dynamic range was found. This will be described below.

<Explanation of Problem 2-2 (Deterioration of Dynamic Range) in "Spatial Frequency Separation Method">

Deterioration of the dynamic range in the arrangement shown in FIG. 9 will be described below. Note that the problem is posed even in the arrangement in FIG. 7.

In the "spatial frequency separation method", the spatial high-frequency component is concentrated to one sub-frame. For example, if the brightness of the display image is increased, saturation occurs first in the sub-frame that displays the high-frequency emphasized image data SH[i]. On the other hand, the sub-frame that the low-frequency image data SL[i] does not yet reach saturation even after the sub-frame displaying the high frequency emphasized data is saturated. FIG. 10 shows the distribution of components contained in sub-frames in a hold-type display device. FIG. 12 shows the distribution in an impulse-type display device. Each hatched portion indicates a high-frequency component.

For this reason, the maximum display brightness becomes smaller as compared to a normal display method (hold-type in FIG. 11, and impulse-type in FIG. 13) in which the entire frame simultaneously reaches the saturation level.

Figure 3:
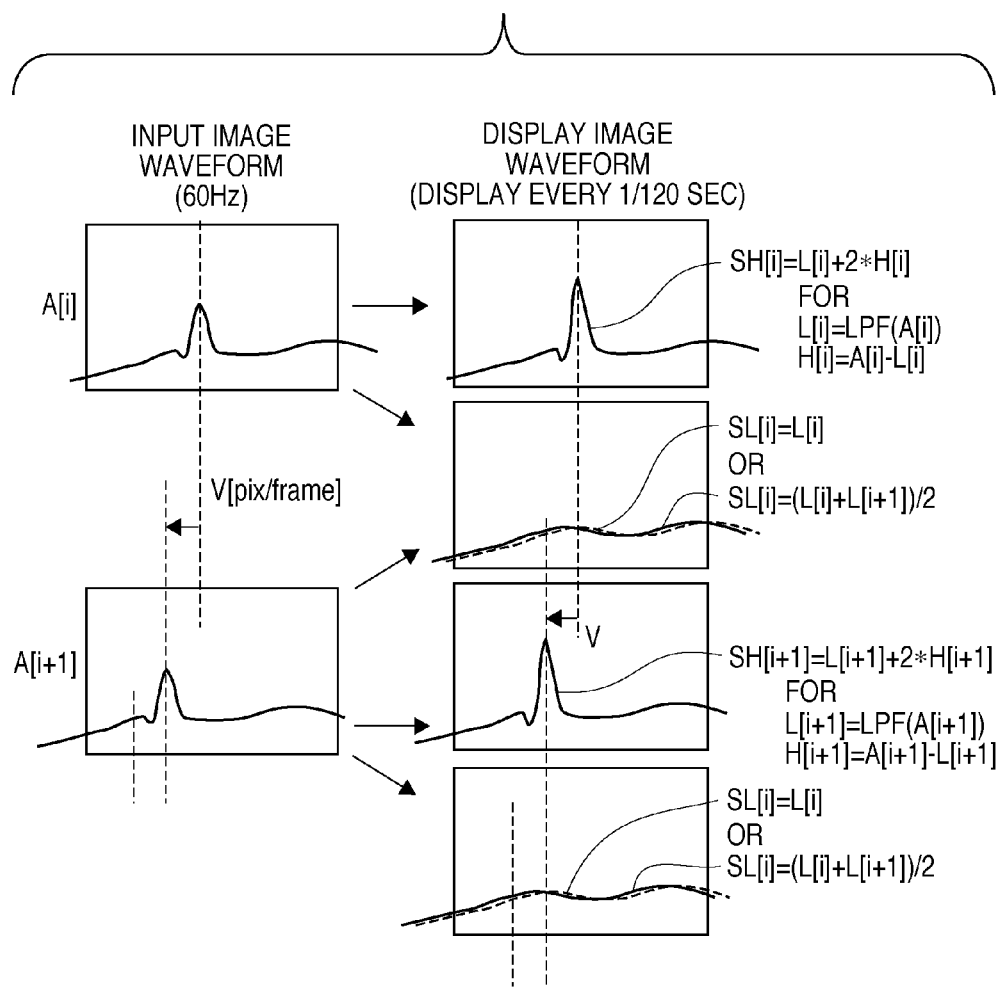
FIG. 3 is a view showing examples of image signal waveforms along a time axis in input frames and double-rate frames in an arrangement in the embodiment.

This can be explained using an actual waveform shown in FIG. 3. The waveforms on the left side of FIG. 3 represent those of an input image A[i] and an input image A[i+1] 1/60 sec later.

The waveforms on the right side represent SH[i] and SL[i] whose interval is 1/120 sec. The human vision recognizes the images switched at 1/120 sec as a time-integrated image. Hence, the frames of at least a still image fundamentally look the same.

The peak of high-frequency emphasized image SH[i] is higher than that of the waveform of the image A[i]. This is because the high-frequency component data of another sub-frame moves to the high-frequency emphasized image SH[i] so the amount of the high-frequency component is doubled. As is apparent from this waveform, the margin to the maximum display level (the upper side of the graph) is obviously smaller than that of the image A[i]. To prevent saturation of the first sub-frame when the maximum value of the image A[i] is input, the original image signal must be multiplied by a ratio smaller than 1 and then input. As a result, the effective dynamic range narrows. That is, the dynamic range is narrower than the proper dynamic range of the display device.

As is apparent from FIGS. 3, 10, and 12, a larger level difference between the first and second double-rate sub-frames, that is, a larger spatial high-frequency component, results in a narrower dynamic range. Additionally, a larger constant value (distance constant value) of filtering of the spatial frequency of the input image results in a larger spatial high-frequency component. This indicates that a larger distance constant value results in a narrower dynamic range. To only prevent the dynamic range from narrowing, the distance constant value is preferably as small as possible. This conflicts with the tendency of the problem 2-1.

First Embodiment

The background (problems) of the present invention has been described above. This embodiment further improves the arrangement in FIG. 9.

An image to be displayed by a first double-rate sub-frame is generated based on a component extracted by filtering one frame of an input image. On the other hand, an image to be displayed at the display timing of a second sub-frame requires image information at a time shifted by 1/120 sec from the time of the first sub-frame and cannot therefore be generated directly from a component obtained by filtering the input image. The image to be displayed by the second sub-frame is generated by inter-frame interpolation of the preceding and succeeding images. In this embodiment, the image to be displayed in the second sub-frame contains only a spatial low-frequency component. Hence, the image to be displayed by the second sub-frame is generated by performing inter-frame interpolation based on motion compensation from the spatial low-frequency components of or near the preceding and succeeding frames obtained by filtering the input image. The spatial high-frequency component is displayed only in the first sub-frame and requires no inter-frame interpolation.

Figure 1:
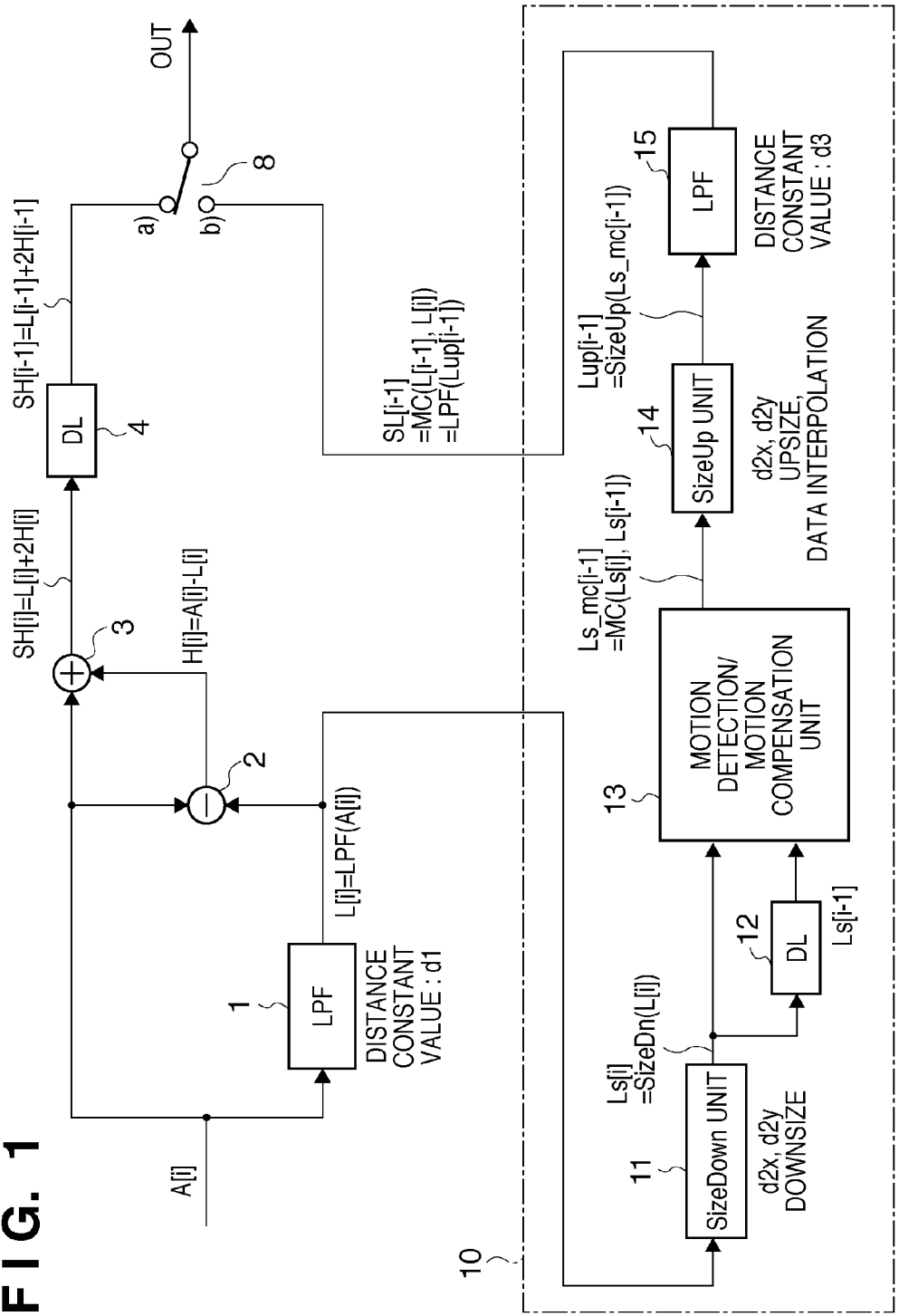
FIG. 1 is a block diagram showing the arrangement of an image processing apparatus according to the first embodiment.

FIG. 1 is a block diagram showing an arrangement of the image processing apparatus according to a first embodiment. The same reference numerals as in FIG. 9 denote the same components in FIG. 1.

Referring to FIG. 1, A[i] is input image data of the current frame. The frame rate of the image data is 60 Hz. A switch 8 alternately selects the inputs every 1/120 sec. The period during which the switch 8 is connected to terminal a) is the output period of the first sub-frame. The period during which the switch is connected to terminal b) is the output period of the second sub-frame.

FIG. 1 is different from FIG. 9 in that an inter-frame interpolation unit 10 is inserted in the process up to the terminal b of the switch 8. The operation of the arrangement in FIG. 1 will be described in order.

An LPF 1 is a two-dimensional lowpass filter. This lowpass filter can use, for example, either a Gaussian function, or a moving average or a weighted moving average. An effective distance at which the filter coefficient is ½ the maximum value (central value), i.e., an effective distance corresponding to a spatial frequency at which the transfer factor is ½ the pass band is defined as a distance constant value d of the filter. The distance constant value d indicates the wavelength of a spatial frequency corresponding to cutoff in limiting the band of an image by a spatial frequency filter. The unit of d is "pixel". The distance constant value d is represented by the vector d=(dx, dy) of x and y components and undergoes a filtering process for each component. The distance constant value of the LPF 1 is d1=(d1$x$, d1$y$). The unit of each of d1$x$ and d1$y$ is [pixel].

The output of the LPF 1 is a spatial low-frequency component L[i] of the input image, which is defined by $$L[i]=\text{LPF1}(A[i]) \tag{1-1}$$

L[i] is sent to a subtractor 2. The subtractor 2 subtracts L[i] from the image data A[i] to generate high-frequency component data H[i] and outputs it to an adder 3.

The adder 3 adds the spatial high-frequency component data H[i] to the image data A[i] and output the sum as high-frequency emphasized image data SH[i].

$$SH[i]=A[i]+H[i]=A[i]+A[i]-L[i]$$

Since A[i]=H[i]+L[i], the high-frequency emphasized image SH[i] can also be expressed by $$SH[i]=2H[i]+L[i] \qquad (1\text{-}2)$$

A frame delay circuit 4 (formed from a storage unit such as a FIFO memory or RAM) delays the high-frequency emphasized image data SH[i] to synchronize it with the second sub-frame to be described below. Hence, the high-frequency image data output from the delay circuit 4 is SH[i−1] which is supplied to the terminal a) of the switch 8 as the first sub-frame.

The low-frequency component data (low-frequency image data) L[i] generated by the LPF 1 is also sent to the low-frequency inter-frame interpolation unit 10. The output of the low-frequency inter-frame interpolation unit 10 is a display signal SL[i] of the second sub-frame, which is obtained by performing inter-frame interpolation based on motion compensation for L[i] and L[i−1] and defined by $$SL[i-1]=MC(L[i],L[i-1]) \qquad (1\text{-}3)$$

The data is not SL[i] but SL[i−1] because the process of the low-frequency inter-frame interpolation unit 10 to be described below must wait for a time corresponding to one input frame (1/60 sec) to refer to the next frame.

<Low-Frequency Inter-Frame Interpolation Unit 10 of Embodiment>

The low-frequency inter-frame interpolation unit 10 according to this embodiment will be described below in detail.

The low-frequency inter-frame interpolation unit 10 of this embodiment literally executes inter-frame interpolation based on motion compensation of only the low-frequency component. The low-frequency component data is image data and will be referred to as low-frequency image data hereinafter.

The low-frequency image data L[i] is an image band-split by the distance constant value d1. Hence, the signal level of a band whose spatial frequency is higher than that corresponding to the distance d1 is very low (however, the degree of smoothing depends on the function of the lowpass filter).

For this reason, in inter-frame interpolation of the image of the low-frequency image data L[i], motion detection need not be performed in the whole spatial frequency band of L[i], that is, for each pixel. Instead, motion detection can be done based on signals sampled at a predetermined period.

A downsize ratio will be defined. A downsize ratio (reduction ratio) is defined in each of the X direction (horizontal direction) and Y direction (vertical direction) of an image. For example, downsizing an image at d2x×d2y is equivalent to setting a window of d2x×d2y pixels in the original image and sampling the pixels of representative points at predetermined positions in the window. In this case, the image is reduced to 1/d2x in the horizontal direction and 1/d2y in the vertical direction.

An image downsized from L[i] is expressed by Ls[i].

$$Ls[i]=SizeDn(L[i]) \qquad (1\text{-}4)$$

In the following description of the low-frequency inter-frame interpolation unit 10, image data is represented with pixel coordinates (x, y), as needed.

The image L before downsizing and the image Ls after downsizing are represented on the coordinate system by, for example, $$L[i]=L[i](x,y) \qquad (1\text{-}5\text{-}1)$$

$$Ls[i]=Ls[i](xs,ys) \qquad (1\text{-}5\text{-}2)$$

Let px and py be the coordinates of a representative point defined in the area of d2x×d2y, which is a unit of downsizing. Then, the coordinate system of L and Ls are represented by $$x=d2x*xs+px \qquad (1\text{-}5\text{-}3)$$

$$y=d2y*ys+py \qquad (1\text{-}5\text{-}4)$$

where d1x, d1y, d2x, and d2y are integers.

In the present invention, these ranges hold if both d1 and d2 are 2 or more. In practice, d1x and d1y are supposed to be in a range of several pixels to several tens of pixels. When the range of d2 with respect to d1 satisfies $$0.5d1x \leq d2x \leq 2d1x \qquad (1\text{-}5\text{-}5)$$

$$0.5d1y \leq d2y \leq 2d1y \qquad (1\text{-}5\text{-}6)$$

the effect of the present invention is maximized in terms of image quality. If d2x is too small, the efficiency is low. If d2x is too large, the resolving power to suppress the motion of the low-frequency component tends to be short. However, d2x may have a larger value depending on the type or the object of the process target image (this also applies to the Y direction).

In the embodiment, an example in which d1=8, and d2=6 will be described. The input image A[i] to be handled in this embodiment is assumed to have 1920 horizontal pixels×1080 vertical pixels. The size of the image of the low-frequency component L[i] is 1920×1080. Since d2x=d2y=6, the size of the reduced image Ls[i] is 320×180 pixels. More specifically, in this embodiment, neither calculation of motion detection nor that of motion compensation is necessary for the 1920×1080 pixels. Image motion detection and motion compensation need only be performed in an image with a 1/6 size in the horizontal and vertical directions. Concerning the area ratio, the amount of calculation can be only 1/36, and the degradation of the image is rarely perceivable.

The downsized image data Ls[i] is supplied to a motion detection/motion compensation unit 13 and a delay circuit 12, as shown in FIG. 1. Based on the reduced image data Ls[i] generated from the current frame and reduced image data Ls[i−1] of the preceding frame from the delay circuit 12, the motion detection/motion compensation unit 13 generates image data Ls_mc[i] located at the intermediate timing between the display time of image i−1 and image i.

In the above description, Ls_mc[i] is generated from two reduced image data sets adjacent in time. However, three or more reduced image data sets may be referred to. The number of reduced image data sets is here set to two for a minimum and necessary arrangement.

Actually, in the calculation for generating the image data Ls_mc[i] after motion compensation in the above-described way, motion detection must be started at least after the last frame to be referred to is input. To do this, the frame needs to be delayed. In this example, since the minimum and necessary arrangement is achieved, as described above, the process need only wait for one frame and then start at a time to allow reference to the next frame. Hence, image data Ls_mc[i−1] is output.

The image data Ls_mc[i−1] is generated in accordance with $$Ls\_mc[i-1]=MC(Ls[i-1],Ls[i]) \qquad (1\text{-}6\text{-}1)$$

The process of generating the image data Ls_mc[i] will be described below in detail.

To obtain Ls_mc[i], it is necessary to perform motion detection and then motion compensation based on the result of motion detection. In this embodiment, the target of motion detection and motion compensation is Ls.

Motion detection will be described. In correspondence with each microarea at a position (x, y) in the image Ls[i], an approximate or coincident microarea is searched for in an image Ls[i+1]. This is called block matching. The search range corresponds to the maximum amount of motion assumed for the original position. Assume that a microarea is found at a position (x+mvsx, y+mvsy). At this time, the motion vector at the coordinate position (x, y) can be expressed by $$MVs[i]=(mvsx,mvsy) \qquad (1\text{-}6\text{-}2)$$

The process of obtaining a motion vector at each pixel position (x, y) of the image Ls[i](x, y) is called motion detection. The motion vector MVs is array data containing data as much as Ls. Data corresponding to each pixel is vector data which is independently determined for each of the x component and y component at each pixel position. MVs can be represented using each component by $$MVs[i](x,y)=(mvsx(x,y),mvsy(x,y)) \qquad (1\text{-}6\text{-}3)$$

Motion compensation will be described next. In this embodiment, motion compensation is obtaining the image Ls_mc[i] corresponding to the intermediate timing between Ls[i] and Ls[i+1] based on the motion vector obtained in the above way. Ls_mc[i](x, y) can be obtained by referring to data of Ls[i] at a pixel position calculated by subtracting ½ the motion vector from the values x and y. Ls_mc[i](x, y) can also be obtained by referring to data of Ls[i+1] at a pixel position calculated by adding ½ the motion vector to the values x and y. These relationships are given by $$Ls\_mc[i](x,y)=Ls[i](x-mvsx(x,y)/2,y-mvsy(x,y)/2) \qquad (1\text{-}6\text{-}4)$$

or $$Ls\_mc[i](x,y)=Ls[i+1](x+mvsx(x,y)/2,y+mvsy(x,y)/2) \qquad (1\text{-}6\text{-}5)$$

One of the results obtained by the equations may appropriately be selected, or the average value of the two results may be calculated.

If mvsx(x, y)/2 or mvsy(x, y)/2 is not an integer, the value is replaced with the maximum integer except the fraction part, and the average value of the results of the equations is calculated.

In this embodiment, the process is delayed by one frame to obtain Ls_mc[i−1](x, y).

The image data Ls_mc[i−1] (the size is 320×180 pixels) obtained by motion detection and motion compensation needs to be upsized to the original image size. A SizeUp unit 14 generates d2x×d2y pixel data from one pixel data. In this embodiment, the SizeUp unit 14 spatially performs linear interpolation (e.g., bilinear method) to generate d2x×d2y pixel data from one pixel in each area (enlargement process), thereby returning the reduced image to the original image size. Image data Lup[i−1] converted into the original size is given by $$Lup[i-1]=SizeUp(Ls\_mc[i-1]) \qquad (1\text{-}7)$$

However, Lup[i] (=1920×1080 pixels) obtained here does not yet have a sufficient characteristic as a low-frequency component image to be displayed by the second sub-frame. The image Lup[i] which has undergone linear interpolation of the SizeUp unit 14 contains an unwanted high-frequency component as a spatial frequency component and is not smooth.

The image to be displayed (output) as the second sub-frame must have a spatial frequency distribution which is almost the same as that of the low-frequency component of the first sub-frames immediately before and after it. More exactly speaking, the spatial frequency distribution must have values between those immediately before and after it. For this purpose, the unwanted high-frequency component is preferably removed. In this embodiment, an LPF 15 is provided at the succeeding stage of the SizeUp unit 14 (the distance constant value of the LPF 15 is d3=(d3x, d3y)). A sufficient smooth result is obtained by removing the unwanted high-frequency component by the LPF 15 so that image data suitable as the second sub-frame SL is obtained.

$$SL[i-1]=LPF2(Lup[i-1]) \qquad (1\text{-}8)$$

In this embodiment, to simplify the arrangement, (d3x, d3y)=(d1x, d1y). This allows a single LPF to serve as the LPFs 1 and 15. The image SL[i−1] to be displayed by the second sub-frame is supplied to the terminal b of the switch 8.

The switch 8 of this embodiment alternately outputs SH[i−1] (=L[i−1]+2H[i−1]) and SL[i−1] (=LPF2(Lup[i−1])) every ¹⁄₁₂₀ sec, thereby implementing an image with reduced movement blurring.

<Effect 2-1 of Embodiment (Improvement of Distortion in Pursuit Waveform)>

As is apparent from the above description, the image data generated as the second sub-frame of this embodiment is generated by executing inter-frame interpolation for the low-frequency images of the first sub-frames of the current and immediately succeeding frames.

The image displayed by the first sub-frame and that displayed by the second sub-frame are not inconsistent regarding the time difference. For this reason, the position of the image of the second sub-frame does not largely shift with respect to the image displayed by the first sub-frame in pursuit. It is therefore possible to recognize the original image by visually time-integrating, that is, adding the two images.

Figure 24A:
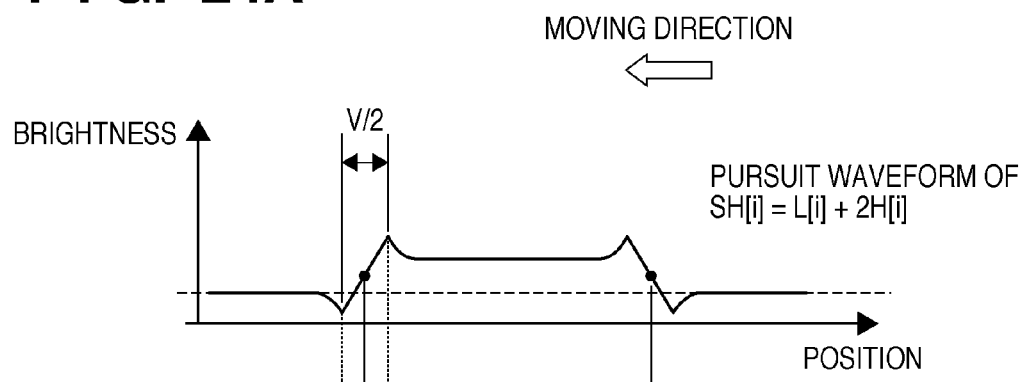
FIGS. 24A to 24C are views for explaining why distortion in a waveform observed by pursuit in a hold-type display device is improved according to the first embodiment.
Figure 24B:
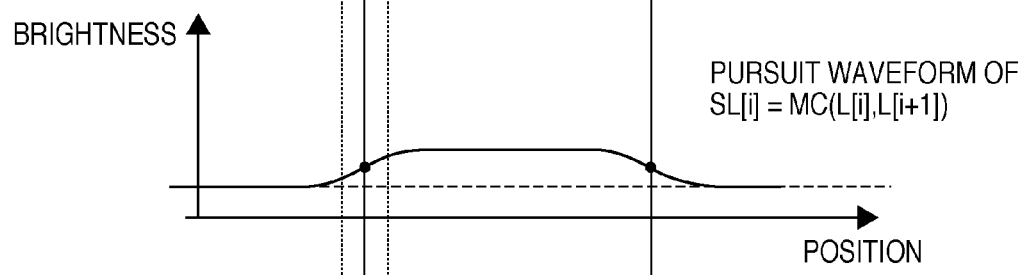
Figure 24C:
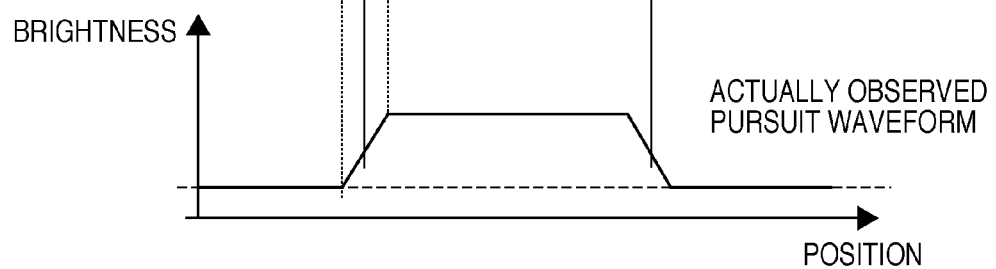
Figure 28A:
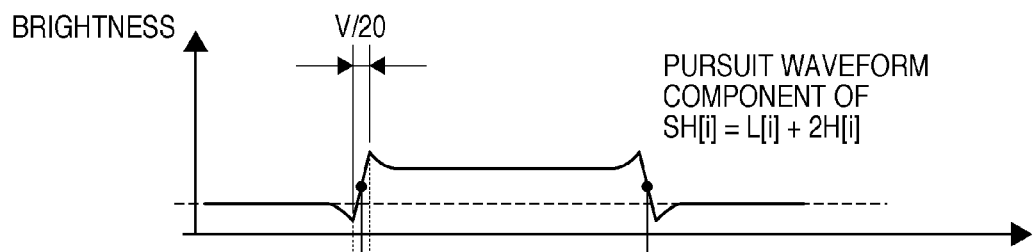
FIGS. 28A to 28C are views for explaining a reason why distortion in a waveform observed by pursuit in an impulse-type display device is improved using the apparatus according to the first embodiment.
Figure 28B:
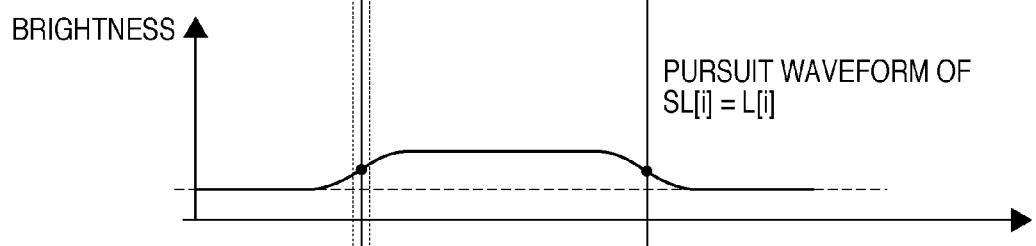
Figure 28C:
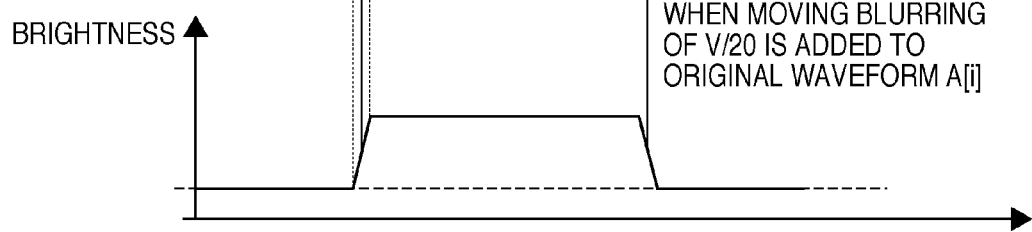

More specifically, the low-frequency component image SL[i] of the second sub-frame does not contain a low-frequency component based on the image information of the same timing as SH[i], unlike FIG. 7. The second sub-frame of this embodiment does not have the average value between the low-frequency component based on the image information of the same timing as the image SH[i] and the low-frequency component based on the image information of the same timing as the high-frequency emphasized image SH[i+1] shown in FIG. 9, either. In a hold-type display device, no waveform distortion in FIG. 22C or 23C occurs, and a more accurate pursuit waveform can be observed, as shown in FIG. 24C. In an impulse-type display device as well, no waveform distortion in FIG. 26C or 27C occurs, and a more accurate pursuit waveform can be observed, as shown in FIG. 28C. FIG. 24A shows the high-frequency emphasized image of the embodiment. FIG. 24B shows the low-frequency image of the embodiment. FIG. 24C shows an image obtained by combining them (hold-type display device). FIG. 28A shows the high-frequency emphasized image of the embodiment. FIG. 28B shows the low-frequency image of the embodiment. FIG. 28C shows an image obtained by combining them (impulse-type display device).

<Effect 2-2 of Embodiment (Improvement of Dynamic Range)>

In the arrangement shown in FIG. 7, in pursuit, overshoot distortion, undershoot distortion, and tail-blurring distortion are observed in the pursuit waveform, as shown in FIG. 22C or 26C. In the arrangement shown in FIG. 9, overshoot distortion and undershoot distortion are improved to some extent, and tail-blurring distortion is largely improved.

In the arrangements in FIGS. 7 and 9, the dynamic range narrows when the distance constant value of the LPF 1 with respect to the moving speed of the object pursued is set to a sufficiently large value in consideration of the maximum moving speed.

In this embodiment, no distortion occurs in the pursuit waveform, as shown in FIG. 24C or 28C. Hence, it is unnecessary to set a large distance constant value in consideration of distortion in the waveform. Hence, the dynamic range does not narrow.

This effect is always obtained even when the moving speed with respect to the distance constant value is high (when the distance constant value is small with respect to the assumed moving speed). It is therefore possible to set a smaller distance constant value than before.

FIG. 3 shows waveforms in the arrangement shown in FIG. 9. In FIG. 3, the distance constant value to obtain L[i] or {L[i]+L[i+1]}/2 must be set to a relatively large value not to greatly change the entire waveform even when the waveform of SL[i] shifts in the horizontal direction by, for example, V/2.

Figure 4:
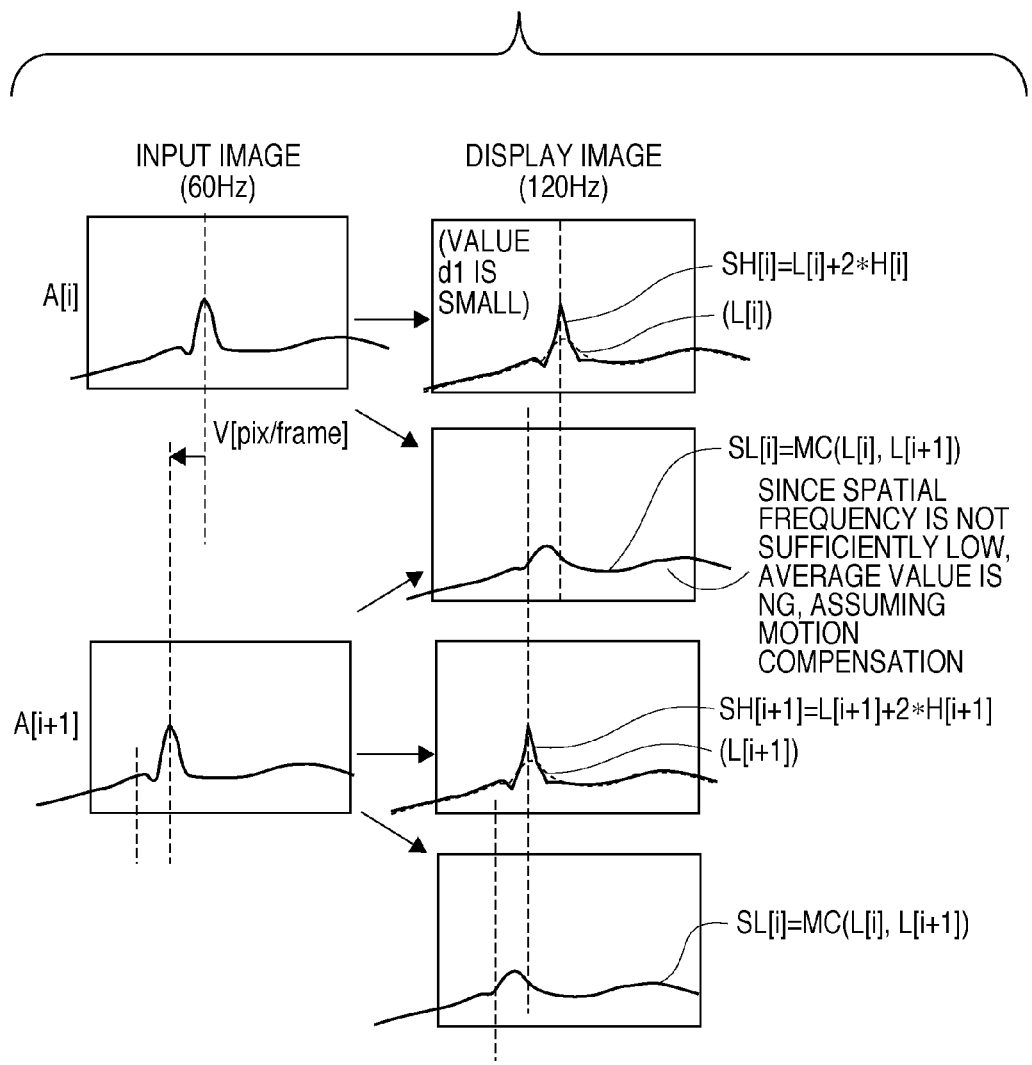
FIG. 4 is a view showing examples of image signal waveforms along a time axis in input frames and double-rate frames according to the embodiment.

FIG. 4 shows the waveforms of this embodiment. In this embodiment, SL[i] is generated by inter-frame interpolation based on motion compensation. Hence, the waveform of SL[i] is located at the correct position. This permits a peak (i.e., high-frequency component) as illustrated to remain to some degree. For this reason, the distance constant value of the filter to determine L[i] as the base can be relatively small. This decreases the ratio of the spatial high-frequency component, that is, the level difference between SH[i] and SL[i]. It is therefore possible to improve the effective dynamic range of the display device, as compared to the arrangement in FIG. 9.

<Effect 1-1 of Embodiment (Small Influence of Motion Detection Error)>

As shown in FIG. 1, this embodiment achieves eliminating noise of the spatial high-frequency component newly generated upon motion detection or SizeUp by inserting the LPF 15 after the SizeUp unit 14. The LPF 15 also provides an effect when an estimation error occurs in motion detection by the motion detection/motion compensation unit 13. If image noise by the estimation error in motion detection contains only a spatial high-frequency component, its magnitude is largely suppressed. Even if the noise also contains a spatial low-frequency component, its magnitude is suppressed so that the noise is visually smooth and unnoticeable.

<Effect 1-2 of Embodiment (Small Calculation Scale)>

In this embodiment, the motion detection target is the reduced image Ls[i] downsized at d2x×d2y. The motion compensation target image is Ls[i−1]. The calculation scale depends on the number of pixels of the target. Hence, the calculation scale can largely be reduced as the number of pixels absolutely decreases. The reduction ratio of the amount of calculation is almost the square of the reduction ratio of the number of pixels.

<Modification of First Embodiment>

An example will be described in which a process equivalent to the first embodiment is implemented by a computer program. An apparatus for executing the computer program can be an information processing apparatus such as a personal computer (to be referred to as a PC hereinafter). The hardware of the PC is well known to those skilled in the art. We assume that a moving image data file containing m frames per unit time is already stored in a storage device (or storage medium) such as a hard disk. An example will be described in which the CPU for executing the application (computer program) of this modification converts the file into moving image data to be played back by double frames per unit time, that is, 2m frames per unit time, and saves the conversion result in the hard disk as a file. The conversion target moving image data is stored in the storage device. The moving image data after double-rate conversion is also stored in the storage device. Hence, the application need not display the double-rate conversion result. That is, note that the CPU need not execute the process in synchronism with the frame rate of the moving image represented by the conversion target moving image data, either. The application of the modification is also stored in the hard disk. The CPU loads the application to the RAM and executes it.

Figure 14:
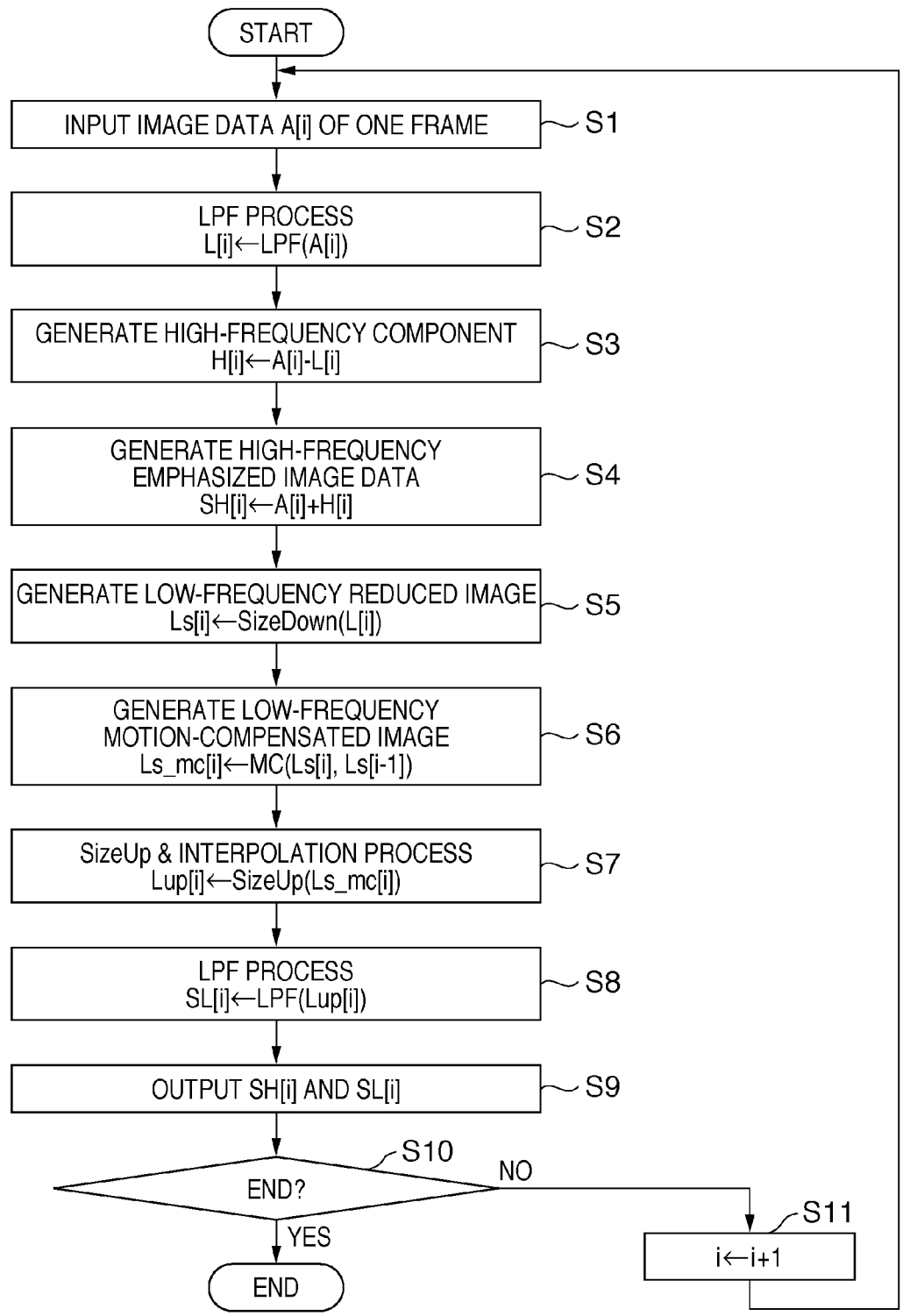
FIG. 14 is a flowchart illustrating the process procedure of a computer program according to a modification of the first embodiment.

FIG. 14 is a flowchart illustrating the process procedure of the application. The execution process procedure of the CPU will be described below with reference to FIG. 14.

In step S1, the CPU loads image data A[i] of one frame from the conversion target moving image data file to the RAM. If the data is encoded, the CPU executes a corresponding decoding process.

In step S2, the CPU filters the input image data frame A[i] of interest using a preset lowpass filter (table) to generate low-frequency image data L[i].

The process advances to step S3. The CPU generates high-frequency component data H[i].

$$H[i]=A[i]-L[i]$$

In step S4, the CPU generates high-frequency emphasized image data SH[i] and temporarily stores it in the RAM.

$$SH[i]=A[i]+H[i]=2A[i]-L[i]$$

In step S5, the CPU generates reduced image data Ls[i] from the low-frequency component data L[i] (in the first embodiment, the size is reduced to ⅙ in both the horizontal and vertical directions).

$$Ls[i]=\text{SizeDown}(L[i])$$

In step S6, a motion detection process is executed based on reduced image data L[i−1] generated from the immediately preceding input frame and the reduced image data L[i] generated from the current frame. A motion compensation process is executed based on the detected motion to generate reduced image data Ls_mc[i] located at the intermediate position in time at which the current frame and the immediately preceding input frame are input, or would be displayed. At this time, the reduced image data Ls[i] is stored in the RAM to prepare for the processing of the next frame.

In step S7, the low-frequency motion-compensated image Ls_mc[i] is returned to the original size. If the process is the same as in the first embodiment, the number of pixels is increased by six times in both the horizontal and vertical directions.

In step S8, the low-frequency motion-compensated image Ls_mc[i] further passes through a lowpass filter to generate the second sub-frame SL[i].

In step S9, the CPU stores the two generated sub-frames SH[i] and SL[i] as output moving image data in the storage device.

The process advances to step S10. The CPU determines whether all frames of the conversion target moving image data file have been converted. This process can be done by determining whether the file end of the conversion target moving image data file is detected.

If NO in step S10, the variable i is incremented by "1" in step S11, and the process from step S1 is repeated.

If YES in step S10, the CPU finishes the series of double-rate conversion processes.

As described above, as compared with the first embodiment, the conversion process speed depends on the CPU. It is however possible to create a double-rate moving image data file having the same function and effect as in the first embodiment.

Second Embodiment

Figure 2:
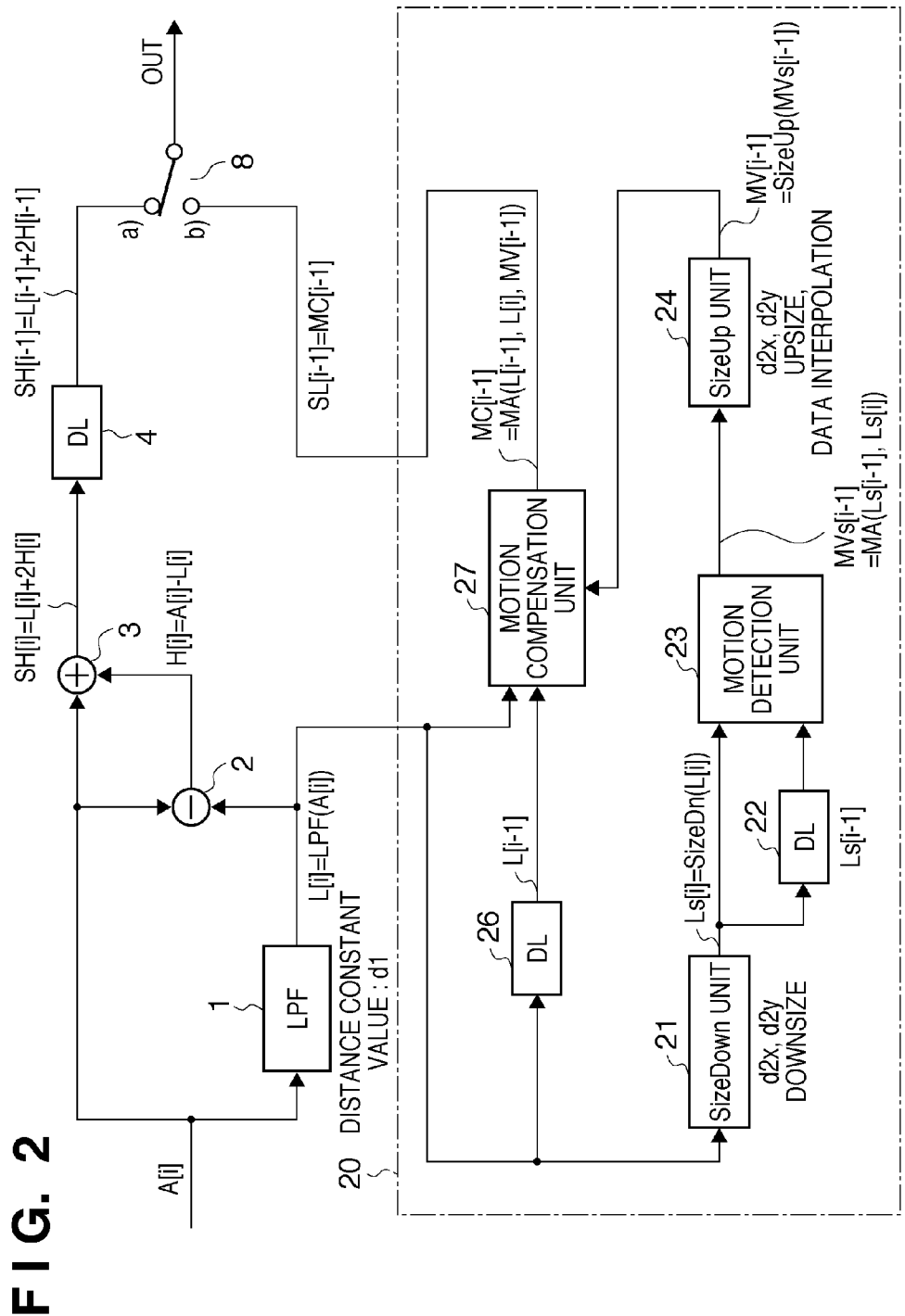
FIG. 2 is a block diagram showing the arrangement of an image processing apparatus according to the second embodiment.

The second embodiment of the present invention will be described next. FIG. 2 is a block diagram showing the arrangement of an image processing apparatus according to the second embodiment.

In the second embodiment, a low-frequency inter-frame interpolation unit 20 is different from the low-frequency inter-frame interpolation unit 10 of the first embodiment (FIG. 1).

In the second embodiment, motion detection is done using a low-frequency component image Ls downsized by a value corresponding to the distance constant value of an LPF 1, as in the first embodiment. However, a motion compensation unit 27 performs motion compensation based on the motion detection result for original low-frequency image data L before downsizing. This obviates the LPF after motion compensation or reduces the scale of the LPF.

The low-frequency image data L[i] output from the LPF 1 is input to the low-frequency inter-frame interpolation unit 20 of the second embodiment, as in the first embodiment. The low-frequency image data L[i] is supplied to a SizeDown unit 21 and then subjected to a motion detection process. Based on the motion detection result, the motion compensation unit 27 executes motion compensation of the target low-frequency image data L[i] and L[i−1] to generate image data MC[i−1]. For this purpose, delay circuits 22 and 26 are provided. The delay circuits 22 and 26 can be formed from a storage unit such as a FIFO memory or RAM.

For easy understanding of the second embodiment, a description will be made assuming that d1=8, and d2=6. An input image A[i] to be handled in the second embodiment is assumed to have 1920×1080 pixels. Since d2$x$=d2$y$=6, the size of the reduced image Ls[i] is 320×180 pixels. More specifically, in the second embodiment, no motion detection is performed for the image having 1920×1080 pixels. Motion detection is performed for the image having a ⅙ size in both the horizontal and vertical directions. This largely reduces the amount of calculation of motion detection. In the first embodiment, the two processes, motion detection and motion compensation are executed for a downsized image. In the second embodiment, however, the motion detection process is performed for the downsized image, whereas the motion compensation process is performed for the image with the original size.

The downsized reduced image data Ls[i] is supplied to the delay circuit 22 and a motion detection unit 23. The motion detection unit 23 receives the reduced image data Ls[i−1] of the preceding input frame from the delay circuit 22 and the reduced image data Ls[i] of the current frame and generates motion vector data MVs[i−1].

As a measure against the moving image characteristic in pursuit, motion detection is preferably executed using the reduced image data Ls of a total of three frames, for example, the current frame and preceding and succeeding frames. However, this leads to an increase in the load due to an increase in the amount of calculation and also an increase in the cost due to an increase in the memory capacity. Taking this into consideration, in the second embodiment, a minimum and necessary arrangement is designed to generate the motion vector data MVs[i] based on the sub-frame Ls[i] that the current low-frequency image and the sub-frame Ls[i−1] that is the immediately preceding low-frequency image. In calculation for generating the image data after motion detection and motion compensation, the calculation for motion detection must be started at least after the last frame to be referred to is input. To do this, the frame needs to be delayed. In this example, since the minimum and necessary arrangement is achieved, the calculation process must only wait for one frame and then start at a timing to allow reference to the next frame. Hence, the motion vector data MVs[i−1] is output.

$$MVs[i-1]=MV(Ls[i-1],Ls[i]) \quad (2\text{-}1)$$

The detailed process of the motion detection unit 23 is, for example, as follows.

In correspondence with each microarea at a position (x, y) in the image Ls[i], an approximate or coincident corresponding microarea is searched for in the image Ls[i−1]. This is called block matching. The search range corresponds to the maximum motion amount assumed for the original position. Assume that a corresponding microarea is found at a position (x+mvsx, y+mvsy). At this time, the motion vector at the coordinate position (x, y) can be expressed by $$MVs[i]=(mvsx,mvsy) \quad (1\text{-}6\text{-}3) \text{ (repeated)}$$

The process of obtaining a motion vector at each pixel position (x, y) of the image Ls[i](x, y) is called motion detection. The motion vector MVs is array data containing data as much as Ls. Data corresponding to each pixel is vector data which is independently determined for each of the x component and the y component at each pixel position. MVs can be represented using the x and y components by $$MVs[i](x,y)=(mvsx(x,y),mvsy(x,y)) \quad (1\text{-}6\text{-}3) \text{ (repeated)}$$

The process of the motion detection unit 23 must wait for one frame and then start at a timing to allow reference to the next frame. Hence, the vector data MVs[i−1] is output.

One vector data is expressed by, for example, {mvsx, mvsy} based on the x and y components each of which is expressed as 4-bit data (a total of 8 bits) including the positive or negative sign. This can cope with a moving distance of +8 pixels in each direction. In this embodiment, d2$x$=d2$y$=6. Hence, the maximum moving distance with respect to the original image is ±48 pixels that is a sufficient distance.

The motion detection unit 23 generates vector data for each pixel. Hence, the number of vectors is equal to the number of pixels of Ls[i].

A SizeUp unit 24 receives the motion vector data MVs[i−1] and performs a vector interpolation process, thereby generating vector data MV[i−1] corresponding to the L[i] and L[i−1] before reduction.

$$MV[i-1]=SizeUp(MVs[i-1]) \quad (2\text{-}2\text{-}1)$$

$$MV[i-1](x,y)=(mvx(x,y),mvy(x,y)) \quad (2\text{-}2\text{-}2)$$

In this embodiment, MV[i] corresponding to L[i] is array data containing 1920×1080 vectors representing motions. On the other hand, MVs[i] corresponding to Ls[i] reduced by d2$x$=d2$y$=6 is array data containing 320×180 vectors representing motions.

To increase the size of MVs[i] and generate MV[i], the SizeUp unit 24 spatially performs linear interpolation (using, for example, a bilinear method) for each of the x and y components, thereby generating vector data corresponding to the d2$x$×d2$y$ pixels in each area (i.e., corresponding to each pixel).

The motion compensation unit 27 generates the low-frequency image data MC[i−1] after motion compensation based on the vector data MV[i−1] from the SizeUp unit 24. The low-frequency image data MC[i−1] after motion compensation is image data that is estimated to be located at an intermediate time between the time the low-frequency image data L[i] of the current frame and the time the low-frequency image data L[i−1] of the preceding frame are input or to be displayed.

$$MC[i-1]=MA(L[i-1],L[i],MV[i-1]) \quad (2\text{-}3)$$

In the detailed generation process of MC[i], the following two calculations are performed, and one of the calculation results is selected and employed. Alternatively, the average value is calculated.

$$MC[i](x, y) = L[i](x - mvx(x, y)/2, y - mvy(x, y)/2) \quad (2\text{-}4\text{-}1)$$

$$MC[i](x, y) = L[i+1](x + mvx(x, y)/2, y + mvy(x, y)/2) \quad (2\text{-}4\text{-}2)$$

If, e.g., mvx(x, y)/2 or mvy(x, y)/2 is not an integer, equations (2-4-1) and (2-4-2) are calculated using the integer part except the fraction part, and the average value of the results is calculated. Note that the output from the motion compensation unit 27 is actually delayed by one frame, MC[i−1](x, y) is output.

The image data MC[i−1] that has undergone motion compensation is supplied to a terminal b) of switch 8 as an image SL[i−1] to be displayed by the second sub-frame. In the second embodiment, the switch 8 alternately outputs SH[i−1] and SL[i−1] every 1/120 sec, thereby implementing an image with reduced movement blurring.

As described above, according to the second embodiment, the LPF 15 in the arrangement in FIG. 1 can be omitted. The number of pixels handled by the motion compensation unit 27 is larger than that handled by motion compensation of the motion detection/motion compensation unit 13 of the first embodiment, by a ratio of d2x*d2y. However, this poses no serious problem because the process load is much lighter than that of the motion detection unit 23. If anything, since motion compensation is performed for the original number of pixels, the accuracy after motion compensation is high, and the image is guaranteed to have a higher quality than in the first embodiment.

Third Embodiment

In the third embodiment, motion detection and motion compensation are done using low-frequency image data L[i] having the same image size as an input image.

Figure 15:
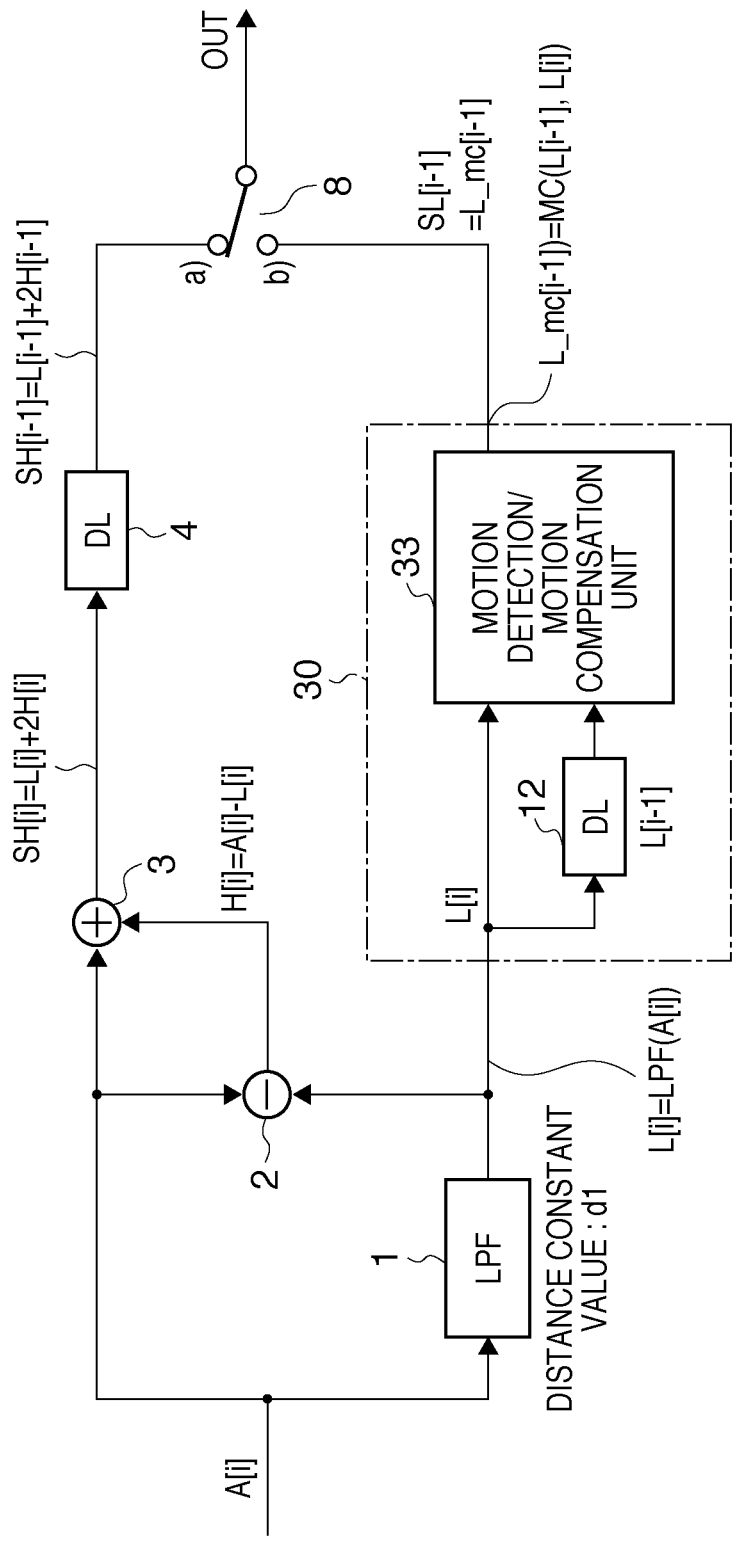
FIG. 15 is a block diagram showing the arrangement of an image processing apparatus according to a third embodiment.

FIG. 15 is a block diagram showing the arrangement of an image processing apparatus according to the third embodiment.

Referring to FIG. 15, A[i] is an input image. The frame rate of the input image is, for example, 60 Hz. A switch 8 alternately selects input terminals a) and b) every 1/120 sec. The period during which the switch 8 selects the terminal a) is the output period of the first sub-frame. The period during which the switch 8 selects the terminal b) is the output period of the second sub-frame. The arrangement from the process of the input image A[i] to the terminal a) is the same as described above. The arrangement of the process up to the terminal b) of the switch 8 is different. This will be described below.

LPF 1 is a two-dimensional lowpass filter. This lowpass filter can use, for example, a Gaussian function, or a moving average, or a weighted moving average. An effective distance at which the filter coefficient is ½ the maximum value (central value), that is, an effective distance corresponding to a spatial frequency at which the transfer factor is ½ the pass band is defined as a distance constant value d of the filter. The distance constant value d indicates the wavelength of a spatial frequency corresponding to cutoff in limiting the band of an image by a spatial frequency filter. The unit of d is "pixel".

The distance constant value d is represented by the vector d=(dx, dy) of x and y components and undergoes a filtering process for each component. The distance constant value of the LPF 1 is d1=(d1x, d1y). The unit of each of d1x and d1y is [pixel]. The output of the LPF 1 is a spatial low-frequency component data (low-frequency image data) L[i] of the input image, which is defined by $$L[i]=LPF1(A[i]) \quad (1\text{-}1) \text{ (repeated)}$$

The low-frequency image data L[i] is sent to a subtractor 2. The subtractor 2 and an adder 3 generate high-frequency emphasized image data SH[i].

$$SH[i]=2H[i]+L[i] \quad (1\text{-}2) \text{ (repeated)}$$

The high-frequency emphasized image data SH is supplied to the terminal a) of the switch 8 via a delay circuit 4 as high-frequency emphasized image data SH[i−1] delayed by one frame. The high-frequency emphasized image data SH[i−1] is the display signal of the first sub-frame of the double-rate image.

The low-frequency image data L[i] is also sent to a low-frequency component motion compensation unit 30. The low-frequency component motion compensation unit 30 performs motion compensation of the low-frequency image data L[i] and L[i−1] to generate an image SL[i−1] and supplies it to the terminal b of the switch 8.

$$SL[i-1]=L\_mc(L[i],L[i-1]) \quad (3\text{-}1)$$

That is, the third embodiment can be understood as an arrangement obtained by removing the SizeDown unit, SizeUp unit, and LPF 15 from the arrangement of the first embodiment shown in FIG. 1. In the third embodiment, however, motion detection is done for the same number of pixels as the original image, and this increases the computation load. Hence, the third embodiment is advantageous for input images A[i] having a predetermined size or less. Alternatively, the third embodiment is preferably applied to an arrangement for saving double-rate image data as a file without any necessity to generate double-rate image data in real time.

Fourth Embodiment

Figure 16:
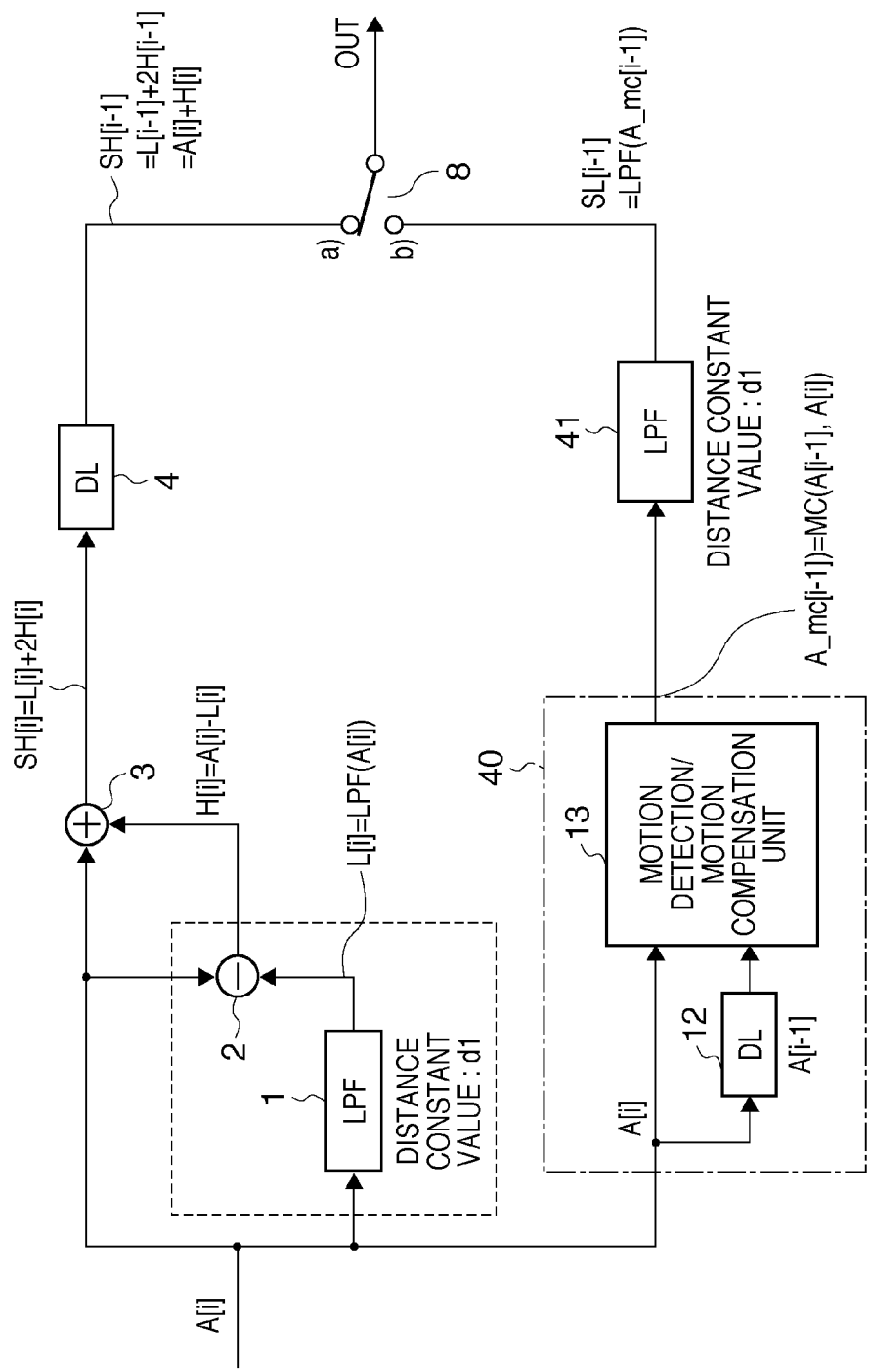
FIG. 16 is a block diagram showing the arrangement of an image processing apparatus according to a fourth embodiment.

FIG. 16 is a block diagram showing the arrangement of an image processing apparatus according to the fourth embodiment.

The arrangement of the fourth embodiment will now be described with reference to FIG. 16.

Referring to FIG. 16, A[i] is an input image. The frame rate of the input image is, for example, 60 Hz. A switch 8 alternately selects input terminals a and b every 1/120 sec. The period during which the switch 8 is connected to the terminal a is the output period of the first sub-frame. The period during which the switch 8 is connected to the terminal b is the output period of the second sub-frame. The arrangement from the process of the input image A[i] to the terminal a of the switch 8 is not largely different from the above embodiments. The process up to the terminal b of the switch 8 is different.

An LPF 1 is a two-dimensional lowpass filter. This lowpass filter can use, for example, a Gaussian function, a moving average, or a weighted moving average. An effective distance at which the filter coefficient is ½ the maximum value (central value), that is, an effective distance corresponding to a spatial frequency at which the transfer factor is ½ the pass band is defined as a distance constant value d of the filter. The distance constant value d indicates the wavelength of a spatial frequency corresponding to cutoff in limiting the band of an image by a spatial frequency filter. The unit of d is "pixel". The distance constant value d is represented by the vector d=(dx, dy) of x and y components and undergoes a filtering process for each component. The distance constant value of the LPF 1 is d1=(d1x, d1y). The unit of each of d1x and d1y is [pixel]. The output of the LPF 1 is a spatial low-frequency component data (low-frequency image data) L[i] of the input image, which is defined by $$L[i]=\text{LPF1}(A[i])\qquad(1\text{-}1)\text{ (repeated)}$$

The low-frequency image data L[i] is sent to a subtractor 2. The subtractor 2 and an adder 3 generate high-frequency emphasized image data SH[i]. The high-frequency emphasized image data SH is supplied to the terminal a) of the switch 8 via a delay circuit 4 as high-frequency emphasized image data SH[i−1] delayed by one frame. The high-frequency emphasized image data SH[i−1] is the display signal of the first sub-frame of the double-rate image.

On the other hand, the input image data A[i] is also supplied to an inter-frame interpolation unit 40. The inter-frame interpolation unit 40 performs a motion compensation process of the input image data A[i] of the current frame and image data A[i−1] of the immediately preceding frame and outputs the result as motion-compensated image data A_mc [i].

$$A\_mc[i\text{-}1]=MC(A[i\text{-}1],A[i])\qquad(4\text{-}1)$$

Actually, the process of the inter-frame interpolation unit 40 must wait for one frame and then start at a time to allow reference to the next frame image. Hence, image data A_mc [i−1] is output.

The spatial frequency distribution of the image data A_mc [i−1] is almost equal to A[i−1] or A[i], or takes an intermediate value between them. In image data SH[i−1] supplied to the terminal a) of the switch 8, the spatial high-frequency component is emphasized. It is therefore necessary to suppress the spatial high-frequency component of the image to be supplied to the terminal b) of the switch 8.

The spatial frequency distribution of the image A_mc[i−1] is close to that of A[i−1] or A[i]. In the fourth embodiment, to implement canceling of the spatial high-frequency component, an LPF 41 is provided at the succeeding stage of the inter-frame interpolation unit. The LPF 41 has the same characteristic as the LPF 1.

The fourth embodiment has an effect of removing the unwanted spatial high-frequency component from the image data A_mc[i−1] by providing the LPF 41. Even when a motion detection estimation error or estimation failure occurs, the magnitude of image noise caused by it is largely suppressed in the image data containing only the spatial high-frequency component. Even if the noise caused by the estimation error or estimation failure also contains a spatial low-frequency component, its magnitude is suppressed so that the noise is visually smooth and unnoticeable.

Fifth Embodiment

The fifth embodiment will now be described. In the fifth embodiment, information obtained by a motion detection process is used for motion compensation, as in the above-described embodiments. Additionally, whether to apply the spatial frequency separation method is selected for each area of an image.

Figure 17:
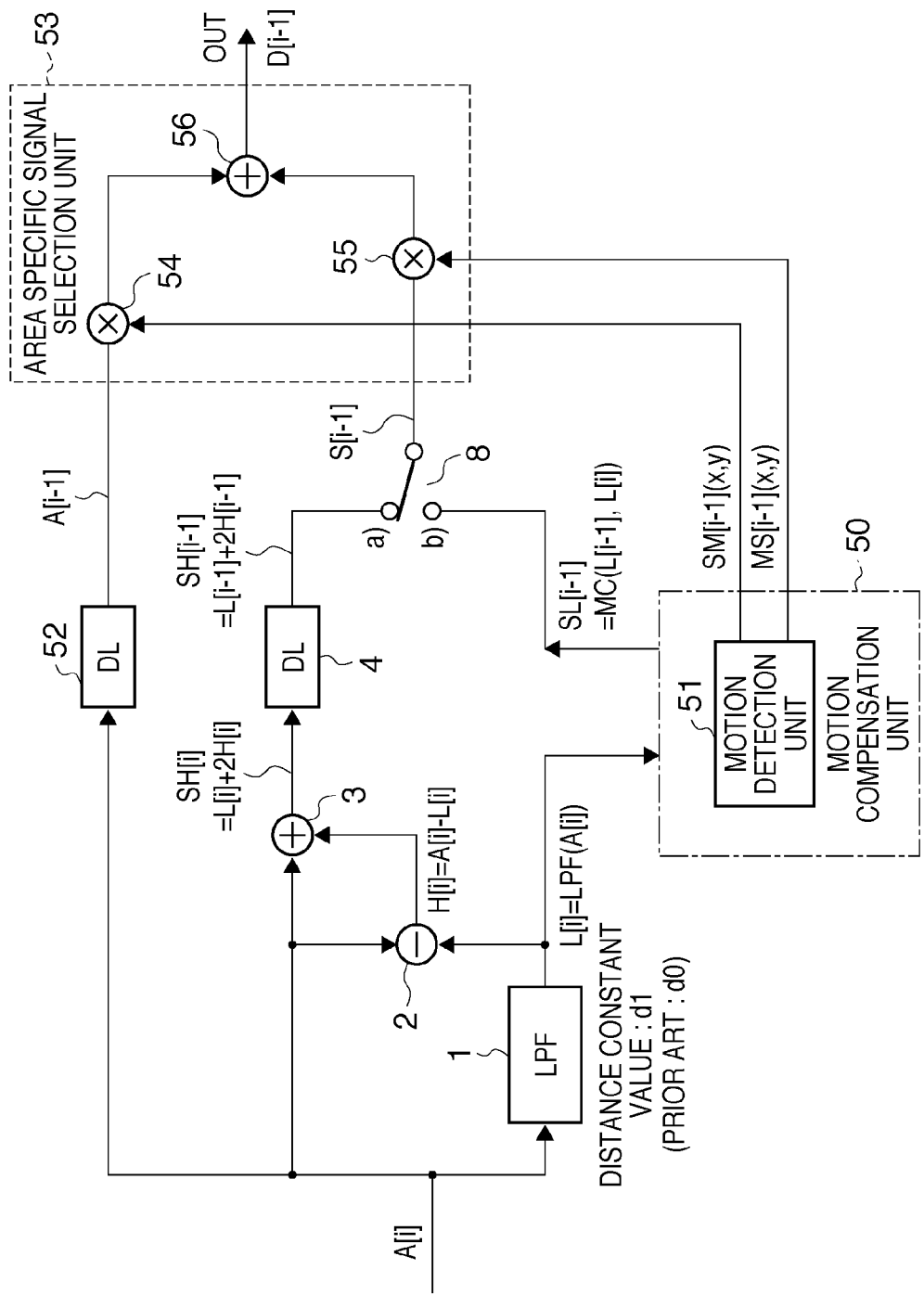
FIG. 17 is a block diagram showing the arrangement of an image processing apparatus according to a fifth embodiment.

FIG. 17 is a block diagram showing the arrangement of an image processing apparatus according to the fifth embodiment.

The arrangement of the fifth embodiment up to terminal a) of switch 8 (the arrangement associated with first sub-frame generation) is the same as the first to fourth embodiments described above. Differences are the arrangement up to a terminal b) of the switch 8, that is, the arrangement associated with second sub-frame generation, and addition of an area specific signal selection unit 53.

Even in the fifth embodiment, the frame rate of input image data is 60 Hz, and two sub-frames corresponding to one input frame are alternately output every 1/120 sec.

In this embodiment, the output image of the switch 8 is represented by S[i−1]. S[i−1] is one of SH[i−1] and SL[i−1]. An inter-frame interpolation unit 50 performs a motion compensation process of low-frequency image data L[i−1] of the preceding frame and low-frequency image data L[i] of the current frame to generate image data MC(L[i−1],L[i]). The inter-frame interpolation unit 50 outputs the image data MC(L[i−1],L[i]) to the terminal b of the switch 8 as the second sub-frame SL[i−1].

The inter-frame interpolation unit 50 incorporates a motion detection unit 51. The motion detection unit 51 outputs motion determination signals SM[i−1] and MS[i−1] to an area specific signal selection unit 53.

The outputs SH and SL of the switch 8 are alternately selected every 1/120 sec and supplied to the area specific signal selection unit 53 as the signal S[i−1]. Image data A[i−1] of the frame of interest is also supplied to the area specific signal selection unit 53 via a delay circuit 52.

The area specific signal selection unit 53 selectively outputs A[i−1] or S[i−1] based on the values of the motion determination signals SM and MS for each area or each pixel of the image data. The signal selectively output from the area specific signal selection unit 53 is represented by D[i−1].

Each of the motion determination signals SM and MS is array data containing as many data items as the number of pixels of the input image data A[i] and serves as a determination signal for each pixel. Each of the motion determination signals SM and MS is a binary signal whose component is 0 or 1. The motion determination signal MS is "1" at a pixel position in an area determined to have a motion in the image signal and "0" at a pixel position in another area (i.e., determined to have no motion). The logic of the motion determination signal SM is the reverse of that for the motion determination signal MS.

The area specific signal selection unit 53 will be described next. For descriptive convenience, the data are defined as follows.

The value of a pixel at coordinates (x, y) in the image data A[i−1] is a(x, y).

The value of a motion determination signal SM[i−1] at the coordinates (x, y) is sm(x, y).

The value of a motion determination signal MS[i−1] at the coordinates (x, y) is ms(x, y).

The value of a pixel at the coordinates (x, y) in the image data S[i−1] is s(x, y).

The value of a pixel at the coordinates (x, y) in the output image D[i−1] is d(x, y).

With these definitions, the value of the pixel at the coordinates (x, y) of the output image D[i−1] can be given by $$d(x,y)=a(x,y)*sm(x,y)+s(x,y)*ms(x,y)\qquad(5\text{-}1)$$

(where "*" indicates not a matrix operation but generating new data at (x,y) by multiplying the values at the same pixel position (x,y))

The first term of the right-hand side of equation (5-1) represents the operation of a multiplier 54. The second term represents the operation of a multiplier 55. More specifically, for an area of sm(x, y)=1, that is, an area determined to have no motion, the pixel data in the input frame of the input image A[i−1] is output. For an area of sm(x, y)=0, that is, an area determined to have a motion, the pixel data in S[i−1] that is the output of the switch 8 is selected and output.

A result generated by causing an adder 56 to add the thus obtained first and second terms is equation (5-1). Each of the multipliers 54 and 55 may be formed from a gate (e.g., AND gate) that passes data in accordance with the motion determination signal. Since only one of the multipliers 54 and 55 passes pixel data, the adder 56 may be omitted.

As described above, according to the fifth embodiment, in an image area determined to have motion, pixel data in the image S[i−1] is selected. In an image area determined to have no motion, the image A[i−1] is selected. This allows the apparatus to always selectively display the most suitable image for each area in accordance with the presence/absence of motion.

Sixth Embodiment

In the first to fifth embodiments, the frame rate of an input image is doubled. In the sixth embodiment, an example will be described in which moving image data having m frames per unit time is input and output as moving image data having N×m frames per unit time. For descriptive convenience, an example in which N=5 will be explained.

Figure 18:
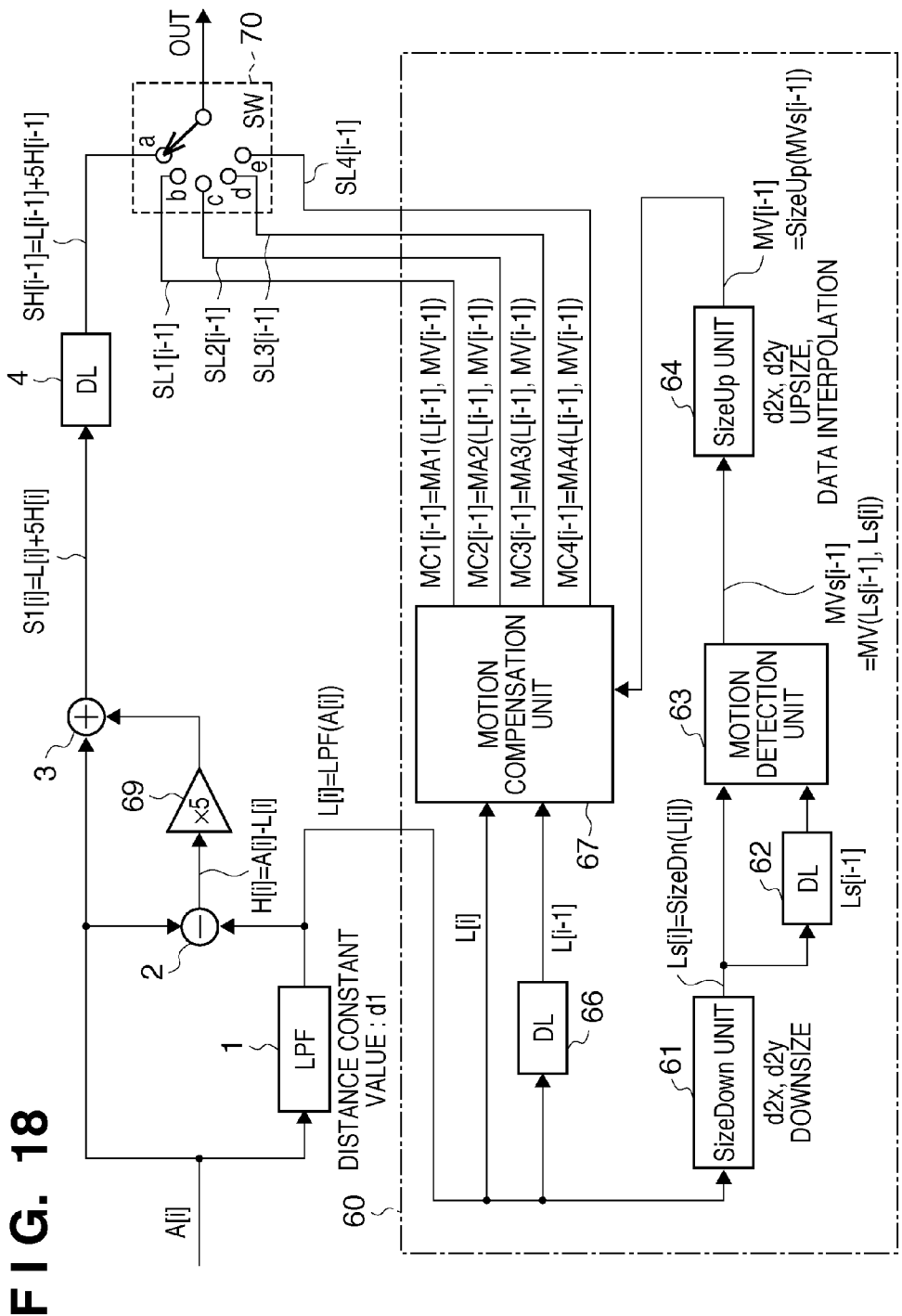
FIG. 18 is a block diagram showing the arrangement of an image processing apparatus according to a sixth embodiment.

FIG. 18 is a block diagram showing the arrangement of an image processing apparatus according to the sixth embodiment.

In this case as well, A[i] is an input image. The frame rate is, for example, 24 Hz (generally known as the frame rate of a movie). A switch 70 sequentially selects five terminals a, b, c, d, and e every 1/120 sec to get back to the start in 1/24 sec.

The period during which the switch 70 is connected to the terminal a is the output period of the first sub-frame. The period during which the switch 70 is connected to the terminal b is the output period of the second sub-frame. Similarly, the connection periods of the terminals c, d, and e of the switch 70 are the third, fourth and fifth sub-frame periods, respectively.

Image data SH (first sub-frame) supplied to the terminal a of the switch 70 is obtained by adding high-frequency component data amplified to five times by a multiplier 69 to the input image data A[i].

$$SH[i]=L[i]+5*H[i-1] \quad (6\text{-}1)$$

In the sixth embodiment, the second to fifth sub-frames ((N−1) sub-frames) to be supplied to the remaining terminals b, c, d, and e of the switch 70 must be generated. The second to fifth sub-frames will be expressed by SL1[i−1], SL2[i−1], SL3[i−1], and SL4[i−1] hereinafter.

The low-frequency component data (low-frequency image data) L[i] that is the output from an LPF 1 is also supplied to an inter-frame interpolation unit 60 of the sixth embodiment. Motion detection in the sixth embodiment is almost the same as that of the above-described second embodiment.

In the sixth embodiment as well, an example in which d1=8, and d2=6 will be described. When the input image A[i] to be handled in the sixth embodiment has 1920×1080 pixels (the low-frequency image data L[i] also has 1920×1080 pixels, as a matter of course), d2x=d2y=6. That is, reduced image data generated by a SizeDown unit 61 has 320×180 pixels. Therefore, in the sixth embodiment, the motion detection process is not performed for the image with 1920×1080 pixels. Instead, motion detection is performed for an image with a ⅙ size in the horizontal and vertical directions. This reduces the amount of calculation significantly.

A motion detection unit 63 receives low-frequency image data Ls[i] obtained by downsizing the image data of the current frame and low-frequency image data Ls[i−1] of the immediately preceding frame from a delay circuit 62 and generates vector data MVs[i−1].

$$MVs[i-1]=MV(Ls[i-1],Ls[i]) \quad (2\text{-}1)\text{ (repeated)}$$

Vectors contained in the vector data MVs[i−1] correspond to the pixels of the frame rate Ls. Hence, the total number of vectors equals the number of pixels of the low-frequency image data Ls.

Next, a SizeUp unit 64 spatially interpolates the vector data MVs[i−1] from the motion detection unit 63, thereby generating vector data MV[i−1] having as many vectors as the number of pixels before downsizing (the spatial interpolation of this portion is the same as in the second embodiment).

$$MV[i-1]=SizeUp(MVs[i-1]) \quad (2\text{-}2\text{-}1)\text{ (repeated)}$$

The processing of the motion detection unit 63 and SizeUp unit 64 are the same as in the above-described second embodiment, and a description thereof will not be repeated.

A motion compensation unit 67 receives the low-frequency image data L[i] of the current frame and the low-frequency image data L[i−1] of the immediately preceding frame. On the basis of the vector data MVs[i−1], the motion compensation unit 67 generates images MC1[i−1] to MC4[i−1] which are obtained by motion compensation of the low-frequency component and should be output as the second to fifth sub-frames.

The motion compensation unit 67 of this embodiment linearly approximates the object motion from the first sub-frame to the fifth sub-frame. Hence, the motion vector MV obtained by the motion detection unit 63 is handled as a common vector in the frame of interest. In this embodiment, N=5. Hence, in each sub-frame, the motion vector of an adjacent sub-frame is approximated by MV/5.

Based on this concept, the motion vector data to be sent to the motion compensation unit 67 can be the same as in the second embodiment. Hence, the outputs of the motion compensation unit 67 are generated as the motion-compensated images of the second to fifth sub-frames by $$MC1[i-1]=MA1(L[i-1],L[i],MV[i-1]) \quad (6\text{-}2)$$

$$MC2[i-1]=MA2(L[i-1],L[i],MV[i-1]) \quad (6\text{-}3)$$

$$MC3[i-1]=MA3(L[i-1],L[i],MV[i-1]) \quad (6\text{-}4)$$

$$MC4[i-1]=MA4(L[i-1],L[i],MV[i-1]) \quad (6\text{-}5)$$

When equations (6-2) to (6-5) are made to correspond to n=1 to 4, equations (6-2) to (6-5) can be rewritten in correspondence with n in the following way. The nth equation corresponds to the nth sub-frame.

$$MCn[i-1]=MAn(L[i-1],L[i],MV[i-1]) \quad (6\text{-}6)$$

The motion vector data supplied to the motion compensation unit 67 of this embodiment is the same as in the second embodiment, as will be described next.

$$MV[i-1](x,y)=(mvx(x,y),mvy(x,y)) \quad (2\text{-}2\text{-}2)\text{ (repeated)}$$

The detailed generation process of MAn[i−1] is as follows.
To obtain the nth sub-frame by referring to a corresponding point of Ls[i], a calculation process is executed in accordance with $$MAn[i](x,y)=Ls[i](x-mvx(x,y)*n/5,y-mvy(x,y)*n/5) \quad (6\text{-}7)$$

To obtain the nth sub-frame by referring to a corresponding point of Ls[i+1], a calculation process is executed in accordance with $$MAn[i](x,y)=Ls[i+1](x+mvx(x,y)*(5-n),y+mvy(x,y)*(5-n)) \quad (6\text{-}8)$$

One of the calculation results may appropriately be selected and employed, or the average value may be calculated.

If the second term of each component is not an integer, for example, the value is replaced with the maximum integer except the fraction part, and the average value of the calculation results of the equations is calculated.

The sub-frames are supplied to the terminals b to e of the switch 70. The switch 70 outputs Nx-rate sub-frames (N=5 in the embodiment) in correspondence with one input frame.

As described above, according to the sixth embodiment, the present invention is also applicable to display image generation in a display device which operates by N sub-frames, that is, at a frame rate N-times that of the input image.

The first to sixth embodiments of the present invention have been described above. In the embodiments, the output destination of each of the finally obtained Nx-rate frames was not mentioned. The output destination can be either a hold- or impulse-type display device. The output destination is not limited to a display device. Instead, the data may be stored in a storage medium such as a DVD or a storage device such as a hard disk as a moving image file.

Like the above-described modification of the first embodiment, the second and subsequent embodiments also allow implementing an equivalent process or function by control of a computer program.

Normally, a computer program is stored in a computer-readable storage medium such as a CD-ROM. The storage medium is set in the read device (e.g., CD-ROM drive) of a computer, and the program is made executable by copying or installing it in a system. Hence, such a computer-readable storage medium is also incorporated in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-207185, filed Aug. 8, 2007, which is hereby incorporated by reference herein in its entirety.

What is claimed is:

1. An image processing apparatus which inputs moving image data containing m frames per unit time and outputs moving image data containing 2m frames per unit time, comprising:

an input unit which inputs image data of each frame;

a filter unit which generates low-frequency image data and high-frequency emphasized image data from the image data of a frame input by the input unit;

an inter-frame interpolation unit which detects a motion between the low-frequency image data generated from the input current frame and the low-frequency image data generated from an immediately preceding input frame and generates motion-compensated low-frequency image data located at an intermediate position in point of time between the low-frequency image data generated from the input current frame and the low-frequency image data generated from the immediately preceding frame; and an output unit which outputs, as a double-rate frame, each of the high-frequency emphasized image data of the immediately preceding input frame and the motion-compensated low-frequency image data generated by the inter-frame interpolation unit.

2. The apparatus according to claim 1, wherein the inter-frame interpolation unit comprises:

a reduction unit which generates reduced image data from the low-frequency image data;

a storage unit which stores the reduced image data obtained by the reduction unit;

a motion compensation unit which generates reduced image data located at an intermediate position in point of time between the reduced image data of the preceding frame and the reduced image data of the current input frame; and an enlargement unit which enlarges the reduced image data obtained by the motion compensation unit to a size before the reduction by the reduction unit and outputs the image data obtained by enlargement as the motion-compensated low-frequency image data that has undergone the inter-frame interpolation.

3. The apparatus according to claim 1, wherein the inter-frame interpolation unit comprises:

a reduction unit which generates reduced image data from the low-frequency image data;

a storage unit which stores the reduced image data obtained by the reduction unit;

a motion detection unit which detects a motion vector of each pixel between the reduced image data of the input frame obtained by the reduction unit and the reduced image data of the preceding frame stored in the storage unit;

a motion vector interpolation unit which generates motion vector data corresponding to an image having a size before the reduction by the reduction unit by spatially interpolating the motion vector of each pixel obtained by the motion detection unit; and a unit which generates, based on the motion vector obtained by the motion vector interpolation unit, low-frequency image data located at an intermediate position in point of time between the low-frequency image data of the input frame obtained by the filter unit and the low-frequency image data of the immediately preceding frame and outputs the generated low-frequency image data as the motion-compensated low-frequency image data.

4. The apparatus according to claim 3, wherein the filter unit generates the low-frequency image data and the high-frequency emphasized image data from the input frame, and the motion detection unit outputs a determination signal representing whether a motion has been detected, wherein the apparatus further comprises an area specific signal selection unit which selectively outputs pixel data in the image data from the output unit when the determination signal represents presence of a motion, and selectively outputs pixel data in the image data of the immediately preceding frame input by the input unit when the determination signal represents absence of a motion.

5. An image processing apparatus which inputs moving image data containing m frames per unit time and outputs moving image data containing Nm frames per unit time, comprising:

an input unit which inputs image data of each frame;

a filter unit which generates high-frequency emphasized image data and low-frequency image data from the image data of a frame input by the input unit;

a reduction unit which generates reduced image data from the low-frequency image data;

a storage unit which stores the reduced image data obtained by the reduction unit;

a motion detection unit which detects motion vector data of each pixel between the reduced image data of the frame obtained by the reduction unit and the reduced image data of the immediately preceding frame stored in the storage unit;

a motion vector interpolation unit which generates motion vector data corresponding to an image having a size before the reduction by the reduction unit by spatially interpolating the motion vector of each pixel obtained by the motion detection unit;

a motion compensation unit which generates, on the basis of the motion vector data obtained by the motion vector interpolation unit, (N−1) low-frequency image data located at an intermediate position in point of time between the low-frequency image data of the input frame, which is generated by the filter unit, and the low-frequency image data of the immediately preceding frame; and an output unit which outputs, as an Nx-rate sub-frame, each of the high-frequency emphasized image data obtained by the filter unit and the (N−1) low-frequency image data generated by the motion compensation unit every time one frame input by the input unit is input.

6. A method of controlling an image processing apparatus which inputs moving image data containing m frames per unit time and outputs moving image data containing 2m frames per unit time, comprising:

an inputting step of inputting image data of each frame;

a filtering step of generating low-frequency image data and high-frequency emphasized image data from the image data of a frame input in the inputting step;

an inter-frame interpolating step of detecting a motion between the low-frequency image data generated from the input current frame and the low-frequency image data generated from an immediately preceding input frame and generating motion-compensated low-frequency image data located at an intermediate position in point of time between the low-frequency image data generated from the input current frame and the low-frequency image data generated from the immediately preceding frame; and an outputting step of outputting, as a double-rate frame, each of the high-frequency emphasized image data of the immediately preceding input frame and the motion-compensated low-frequency image data generated in the inter-frame interpolating step.

7. A method of controlling an image processing apparatus which inputs moving image data containing m frames per unit time and outputs moving image data containing Nm frames per unit time, comprising:

an inputting step of inputting image data of each frame;

a filtering step of generating high-frequency emphasized image data and low-frequency image data from the image data of a frame input in the inputting step;

a reducing step of generating reduced image data from the low-frequency image data;

a storing step of storing the reduced image data obtained in the reducing step;

a motion detecting step of detecting motion vector data of each pixel between the reduced image data of the frame obtained in the reducing step and the reduced image data of the immediately preceding frame stored in the storing step;

a motion vector interpolating step of generating motion vector data corresponding to an image having a size before the reduction in the reducing step by spatially interpolating the motion vector of each pixel obtained in the motion detecting step;

a motion compensating step of generating, on the basis of the motion vector data obtained in the motion vector interpolating step, (N−1) low-frequency image data located at an intermediate position in point of time between the low-frequency image data of the input frame, which is generated in the filtering step, and the low-frequency image data of the immediately preceding frame; and an outputting step of outputting, as an Nx-rate sub-frame, each of the high-frequency emphasized image data obtained in the filtering step and the (N−1) low-frequency image data generated in the motion compensating step every time one frame input in the inputting step is input.

8. A non-transitory computer-readable storage medium storing a computer program, which, when executed by a computer, causes the computer to execute the steps in the method according to claim 7.

\* \* \* \* \*